(12) United States Patent
Webster et al.

(10) Patent No.: US 7,272,109 B2
(45) Date of Patent: Sep. 18, 2007

(54) MODIFIED OFDM SUBCARRIER PROFILE

(75) Inventors: Mark A. Webster, Indian Harbour Beach, FL (US); Albert L. Garrett, Melbourne, FL (US); Steven D. Halford, Palm Bay, FL (US); Michael J. Seals, Melbourne, FL (US)

(73) Assignee: Conexant Systems, Inc., Red Bank, NJ (US)

( * ) Notice: Subject to any disclaimer, the term of this patent is extended or adjusted under 35 U.S.C. 154(b) by 567 days.

(21) Appl. No.: 10/927,487

(22) Filed: Aug. 27, 2004

(65) Prior Publication Data

US 2005/0117670 A1 Jun. 2, 2005

Related U.S. Application Data

(60) Provisional application No. 60/499,821, filed on Sep. 3, 2003, provisional application No. 60/498,052, filed on Aug. 27, 2003.

(51) Int. Cl.
*H04J 11/00* (2006.01)
*H04K 1/10* (2006.01)
*H04L 27/28* (2006.01)

(52) U.S. Cl. .................. 370/208; 370/343; 370/295; 370/203; 370/344; 370/480; 375/260

(58) Field of Classification Search .............. 455/45; 375/260
See application file for complete search history.

(56) References Cited

U.S. PATENT DOCUMENTS

| | | | |
|---|---|---|---|
| 6,424,678 B1 * | 7/2002 | Doberstein et al. | 375/260 |
| 6,721,267 B2 * | 4/2004 | Hiben et al. | 370/206 |
| 2003/0090993 A1 * | 5/2003 | Sato | 370/203 |

* cited by examiner

*Primary Examiner*—Lester G. Kincaid
*Assistant Examiner*—Steven Lim
(74) *Attorney, Agent, or Firm*—Thomas, Kayden, Horstemeyer & Risley, LLP

(57) ABSTRACT

A 10 MHz channelized orthogonal frequency division multiplexing (OFDM) transmitter is provided that communicates using a modified OFDM packet structure with a half-rate oscillator having standard accuracy. The transmitter has an inverse fast fourier transform (IFFT) data processor that appends an outer pair of data subcarriers on either end of an OFDM subcarrier profile. An IFFT long sync processor appends an outer pair of binary phase shift key (BPSK) subcarriers on either end of an OFDM long sync subcarrier profile. By copying or appending the information of the data subcarriers closest to zero Hz. to more robust locations, 10 MHz channelized OFDM can be achieved with half-rate clocks and 20 PPM oscillators.

17 Claims, 25 Drawing Sheets

FEQ: Frequency Domain Equalize (Remove amp and phase distortion)
FEQ: Equalizer designed using the Long Sync

MODIFIED OFDM SUBCARRIER PROFILE

CROSS-REFERENCE TO RELATED APPLICATIONS

This application claims priority to provisional application Nos. 60/498,052 and 60/499,821 filed Aug. 27, 2003 and Sep. 3, 2003, respectively, both entitled "MODIFIED OFDM SUBCARRIER PROFILE."

FIELD OF THE INVENTION

The present invention relates to wireless communications, and more particularly to a modified OFDM subcarrier profile for achieving 10 MHz channels using 20 PPM oscillators.

BACKGROUND OF THE INVENTION

The IEEE 802.11a standard employs orthogonal frequency division multiplexing (OFDM) using 20 megahertz (MHz) wide channels and specifies an accuracy of 20 parts-per-million (PPM). Oscillators with an accuracy level of 20 PPM are sufficient for the IEEE 802.11a standard in the 5 gigahertz (GHz) radio frequency (RF) band.

Two different wireless standards are considering using OFDM with 10 MHz channels, including the IEEE 802.11j standard for use in Japan and the DSRC standardization (Dedicated Short Range Communications). DSRC is a communications approach to allowing short range communications between vehicles and the roadside for a variety of purposes, such as electronic toll collection, intersection collision avoidance, transit or emergency vehicle signal priority, electronic parking payments, and commercial vehicle clearance and safety inspections. IEEE 802.11j (or, "11j") and DSRC have both described achieving OFDM with 10 MHz channels by using a clock at one-half the rate the 802.11a OFDM clock, or 10 MHz kernel sampling, and 10 PPM oscillators. In order to keep the 10 MHz OFDM oscillator-offset performance equal to the 20 MHz 802.11a, the standards committees of both 11j and DSRC have recommended using 10 PPM oscillators.

SUMMARY OF THE INVENTION

A problem with the somewhat straight-forward approach of using a one-half rate clock with 10 PPM oscillators is that 10 PPM oscillators are very expensive as compared to the less accurate 20 PPM oscillators. Although acquisition is sufficiently robust for 20 PPM, the tracking performance can be degraded with DC offsets and flicker noise and high-pass filter (HPF) notching. Many low-cost receivers, such as those employing the zero intermediate frequency (ZIF) architecture (otherwise referred to as direct conversion), contribute a significant level of DC which lies at the center of the multi-carrier received signal. The large frequency offset caused by the less accurate oscillators (e.g., larger PPM) appreciably shifts the receive signal, so that DC and the HPF can potentially destroy the data-carrying subcarriers closest to zero Hz, which in turn significantly lowers performance.

More specifically, using a half-rate clock causes the subcarrier tones to be twice as close together. The normal spacing of subcarriers using 20 MHz channelized OFDM is approximately 312 kilohertz (kHz), which is cut in half to only approximately 156 kHz using 10 MHz channelized OFDM. To mitigate the DC for a ZIF architecture or the like, a HPF is often used. The combination of closer subcarriers, 20 PPM oscillators and the use of the HPF jeopardizes the data subcarriers on either side of zero Hz.

A potential solution is to retain the 20 MHz sampling while using only one-half the number of subcarriers to achieve a 10 MHz channelized OFDM. Although this appears to be a simple approach, it requires complex and expensive changes to existing radio designs. Another solution is to delete the two inner-most subcarriers and move their modulation to two of the four pilot tone locations. Pilot tones have a known pattern at known locations and are used for high jitter frequency tracking. The multi-path characteristic of wireless communications means that some pilot tones may be lost. There is no prior knowledge, however, of which pilot tones are lost. Thus, this approach would require a predetermined known pattern of randomized selection of two of the four pilot tones for data substitution to maintain the desired performance level. Again, however, this approach also requires complex and expensive changes to existing radio designs.

The present invention describes a new approach which provides both good performance and low complexity so that existing radios are easily modified to achieve the desired results. In various exemplary embodiments, 10 MHz channelized OFDM is achieved with half-rate clocks and 20 PPM oscillators by copying the information of the data subcarriers closest to zero Hz to more robust locations. In one such embodiment, the first positive-frequency data subcarrier at frequency location or bin +1 is copied to an outermost positive-frequency data subcarrier appended at frequency location +27 and the first negative-frequency data subcarrier at location −1 is copied to an outermost negative-frequency data subcarrier appended at location −27, to achieve a total of 54 data subcarriers. In various exemplary embodiments, 10 MHz channelized OFDM is achieved with half-rate clocks and 20 PPM oscillators by moving the information of the data subcarriers at zero Hz to more robust locations. In one embodiment, the positive-frequency data subcarriers are shifted up and the negative-frequency data subcarriers are shifted down each by one subcarrier position. New circuitry is not required. Instead, the indexing of the Fast Fourier transform (FFT) and inverse FFT (IFFT) is changed to accommodate the subcarrier shift. In various exemplary embodiments, two extra Long Sync (LS) subcarriers are added at the outer positions for a total of 54 subcarriers for the Long Syncs. The additional LS subcarriers appear to the LS correlator as an insignificant amount of noise so that the existing LS correlation and detection circuitry need not be modified. The additional pair of subcarriers enables retention of the periodicity property of the Long Syncs. In the receiver for LS FEQ estimation, the additional LS subcarriers are separately read and the FEQ is separately calculated, and the innermost subcarriers are discarded.

Alternative configurations are illustrated for both the transmitter and receiver. In one embodiment of the transmitter, the existing transmitter circuit is operated at half-rate using a 20 PPM oscillator and slightly modified to copy the complex coefficients associated with the data subcarriers at the innermost frequency locations and apply the duplicate coefficients to the appended outermost data subcarriers in the frequency domain prior to Inverse Fast Fourier Transform (IFFT) processing. In an alternative transmitter embodiment, the existing transmitter circuitry is unmodified and new circuitry is added in parallel to duplicate the complex coefficients at the innermost bin locations and apply them to time domain samples of tones associated with the outmost redundant subcarriers, and add the results in the time domain. In one embodiment, the existing receiver circuit is used as-is at half-rate. In this first case, the additional subcarriers appear as a relatively minimal amount of extra noise and are ignored. In an alternative embodiment, the receive circuitry is slightly modified to read the appended redundant subcarriers. In this second case, several alternatives are possible. In one embodiment, the receiver simply ignores the potentially corrupted inner-most data subcarriers and always uses the appended redundant subcarriers. Alternatively, the receiver selects between the inner-most and outermost subcarriers and selects the best subcarriers. Alternatively, the receiver coherently combines the extra subcarriers, such as using an optimal weighting function or the like. In another alternative embodiment, the pilot tones are not shifted and the remaining data subcarriers are shifted outwards and around the stationary pilot tones. In yet another alternative embodiment, the inner-most data subcarriers are duplicated and appended to the subcarrier profile on either side of the outer subcarrier positions. For any of the embodiments described herein, only very minimal changes are necessary to existing radio designs. This further enables multi-mode radios, e.g., radios that support 802.11a/g/j and DSRC.

BRIEF DESCRIPTION OF THE DRAWINGS

The benefits, features, and advantages of the present invention will become better understood with regard to the following description, and accompanying drawings where.

DETAILED DESCRIPTION OF THE DISCLOSURE

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
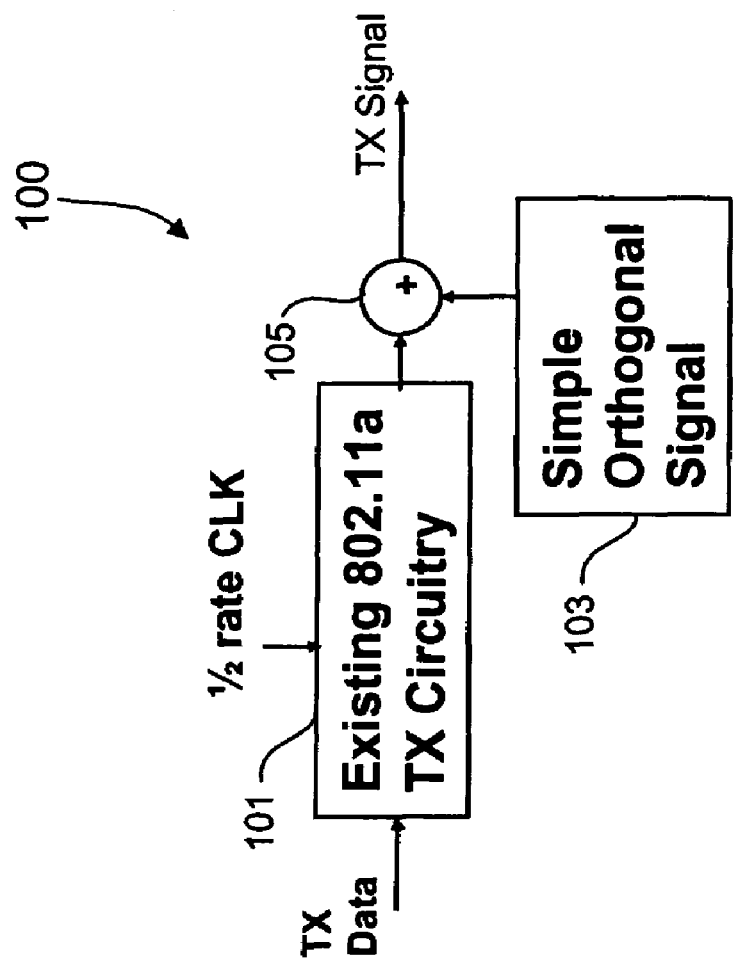
FIG. 1 is a simplified block diagram of a transmitter implemented according to exemplary embodiments of the present invention.

FIG. 1 is a simplified block diagram of a transmitter 100 implemented according to exemplary embodiments of the present invention. The existing 802.11a transmitter circuitry is employed as shown at 101, except operated at one-half rate, e.g., operated using a 10 megahertz (MHz) clock rate rather than the standard 20 MHz clock rate. Also, the RF oscillators are configured as 20 PPM oscillators rather than the more expensive 10 PPM oscillators. Additional circuitry 103 is provided for generating a relatively simple orthogonal signal, which is combined using a combiner 105 or the like to generate the new TX signal for transmission.

Figure 2B:
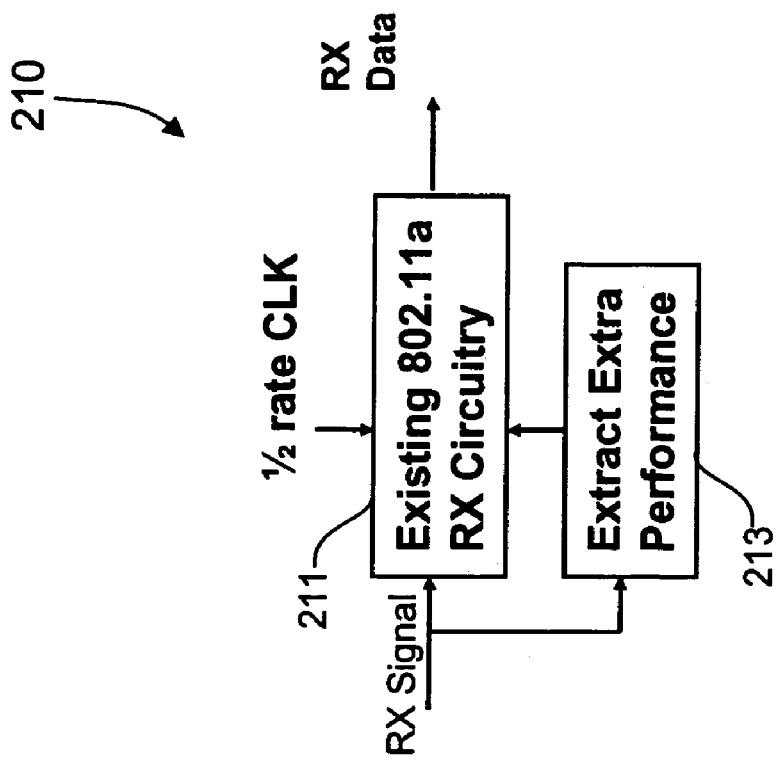
FIG. 2B is a simplified block diagram of a receiver implemented according to another embodiment of the present invention.
Figure 2A:
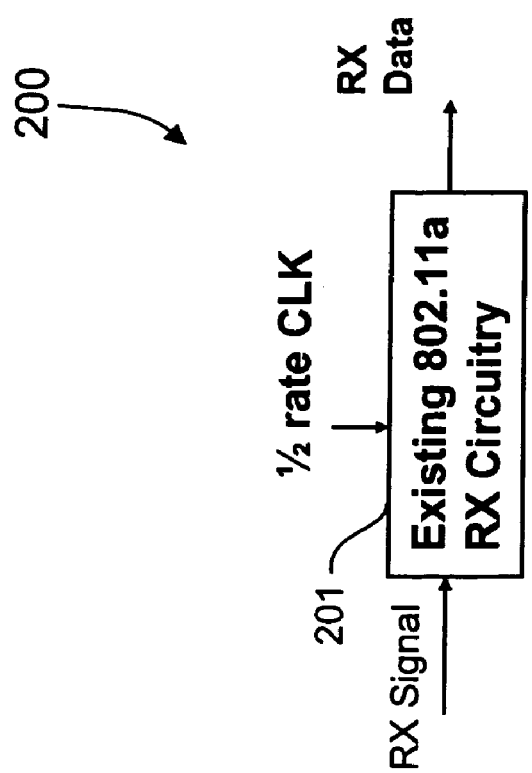
FIG. 2A is a simplified block diagram of a receiver implemented according to one embodiment of the present invention.

FIG. 2A is a simplified block diagram of a receiver 200 implemented according to one embodiment of the present invention. The existing 802.11a receiver circuitry is employed as shown at 201, except operated at one-half rate, e.g., operated using a 10 megahertz (MHz) clock rate rather than the standard 20 MHz clock rate. Also, the RF oscillators are configured as 20 PPM oscillators rather than the more expensive 10 PPM oscillators. The additional subcarriers in the transmitted signal and received as the RX signal appear as a relatively insignificant amount of noise and are ignored by the receiver 200. The RX data does not take advantage of the appended redundant subcarriers and may lose information in one of the subcarriers at frequency locations +1 or −1 due to frequency offset. The loss in performance is about 1 decibel (dB), which may be acceptable in some configurations. The receiver 200 provides the advantage of providing a quick to market solution.

FIG. 2B is a simplified block diagram of a receiver 210 implemented according to another embodiment of the present invention. The existing 802.11a receiver circuitry is employed as shown at 211, except operated at one-half rate, e.g., operated using a 10 megahertz (MHz) clock rate rather than the standard 20 MHz clock rate. Also, the RF oscillators are configured as 20 PPM oscillators rather than the more expensive 10 PPM oscillators. In this case, additional circuitry 213 is incorporated or otherwise added and coupled in parallel with the existing circuitry 211. The additional circuitry 213 extracts extra performance by retrieving the information in the appended redundant subcarriers, as further described below.

Figure 3:
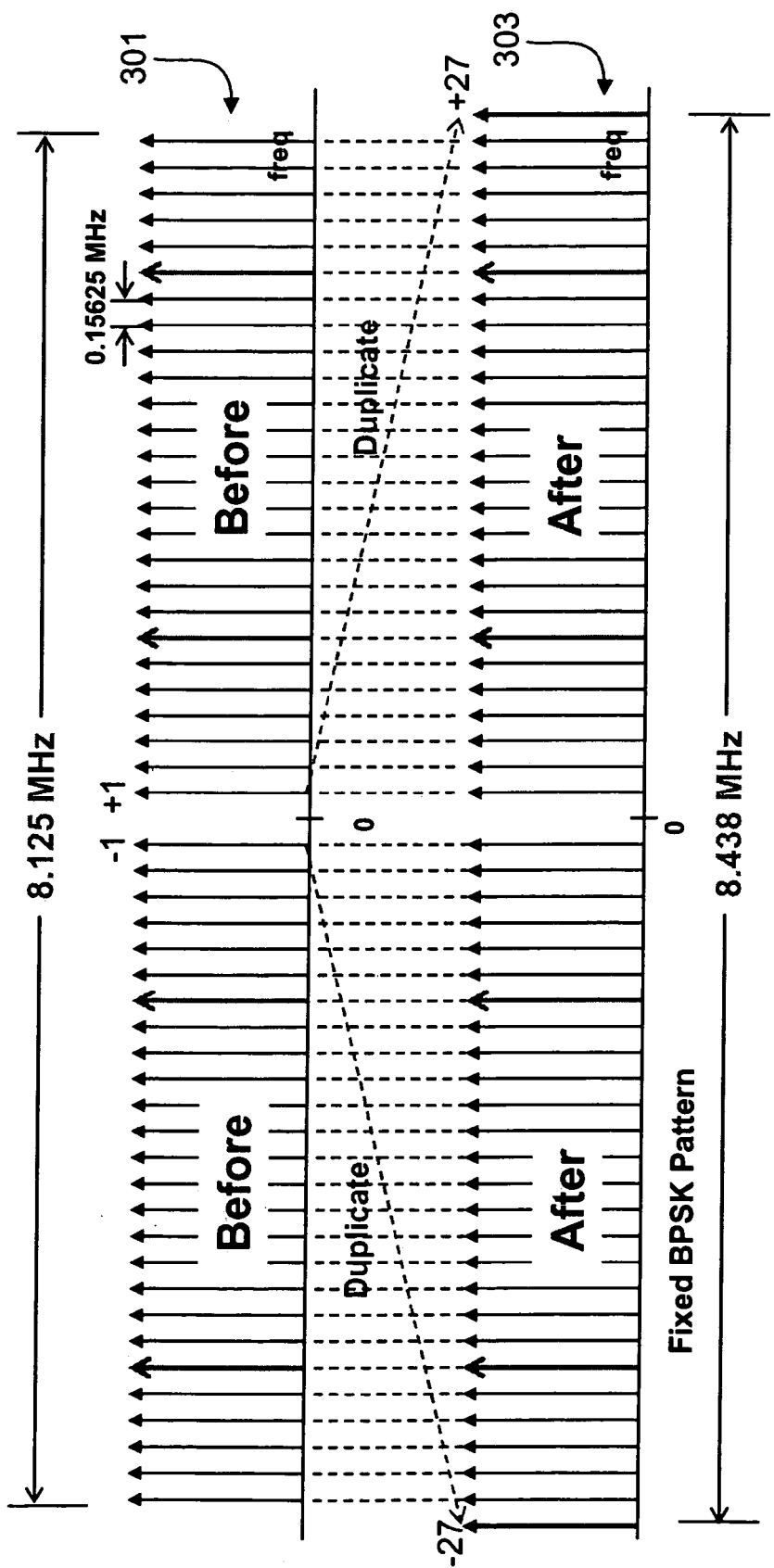
FIG. 3 is a graph diagram of a 10 MHz OFDM subcarrier packet structure profile before and after appending redundant subcarriers in accordance with an exemplary embodiment of the present invention.

FIG. 3 is a graph diagram of a 10 MHz OFDM subcarrier packet structure profile before and after appending redundant subcarriers in accordance with an exemplary embodiment of the present invention. The original subcarrier packet structure profile is shown at 301 and the appended subcarrier packet structure profile is shown at 303. In particular, the innermost positive-frequency subcarrier +1 is duplicated to an appended outermost subcarrier +27 and the innermost negative-frequency subcarrier −1 is duplicated to an appended outermost subcarrier −27. Consequently, there is approximately a 4% increase (2/52) in the overall bandwidth with a small increase in adjacent channel interference. The bandwidth increases from about 8.125 MHz to about 8.438 MHz. The transmit (TX) spectral mask is slightly modified. The TX subcarrier flatness requirement may be modified slightly. The subcarrier spacing of about 156.25 kHz remains unchanged. As illustrated, a significantly larger guard band of +/−312.5 kHz is provided on either side of zero Hz for the profile 703 as compared to the non-shifted profile of 701.

Figure 4:
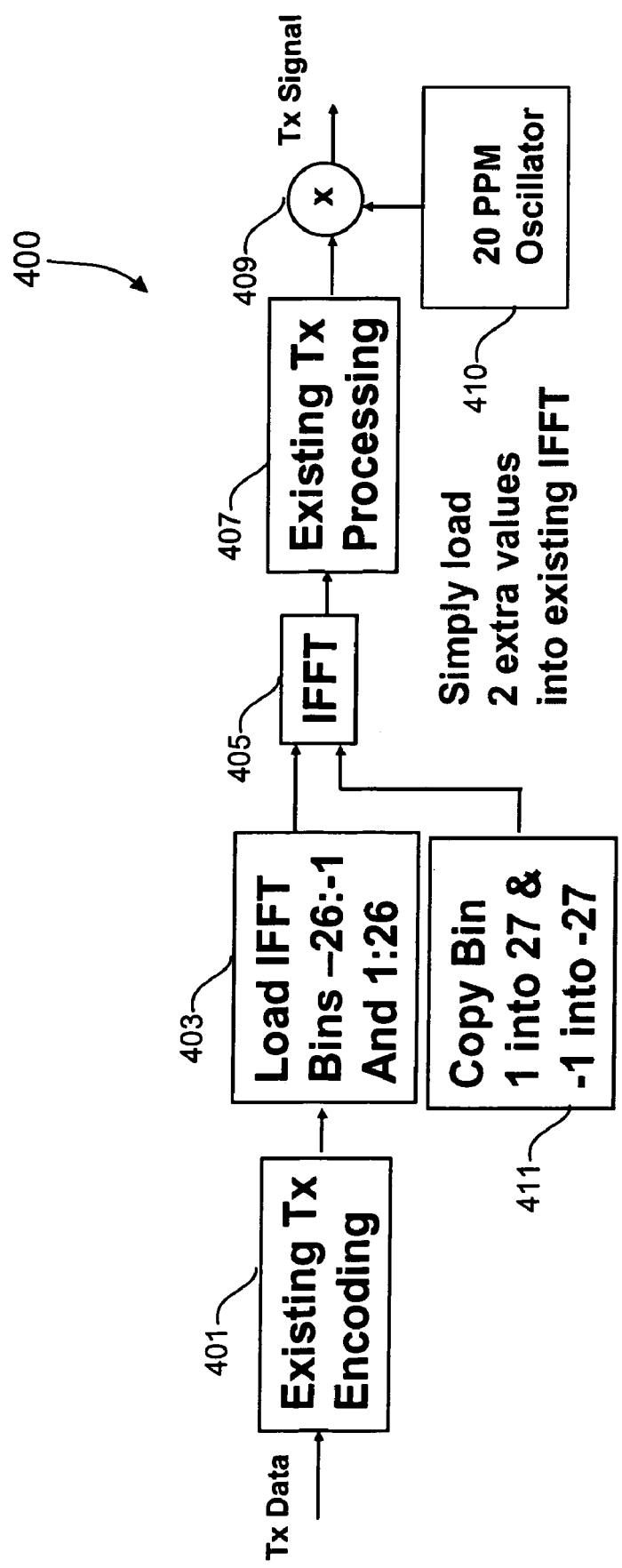
FIG. 4 is a simplified block diagram illustrating a transmit (TX) data symbol subcarrier processor for the appended redundant 10 MHz OFDM subcarrier packet structure profile in accordance with an exemplary embodiment of the present invention.

FIG. 4 is a simplified block diagram illustrating a transmit (TX) data symbol subcarrier processor 400 for the appended redundant 10 MHz OFDM subcarrier packet structure profile in accordance with an exemplary embodiment of the present invention. The transmit data is encoded using an existing and unmodified TX encoder 401. The encoded data from the encoder 401 is provided to block 403, in which the 52 IFFT bins −26:−1 and 1:26 are loaded as usual with 52 complex coefficients corresponding to the 52 subcarriers for OFDM. Additional circuitry 411 is added as shown at 411 in which the complex coefficients at bins 1 and −1 are copied to bins +27 and −27, respectively, for the IFFT block 405. The IFFT block 405 performs IFFT processing in a similar manner as existing transmitters, except incorporating the added redundant outermost subcarriers.

As known to those skilled in the art, the IFFT block 405 is a 64-point Fourier transform block (e.g., bins −32:−1, 1:32 without a zero position). In this case, the 54 bins −27:−1 and 1,27 of the IFFT block 405 are loaded with complex coefficients from blocks 403 and 411 and with the remaining 10 bins (−32:−28, 28,32) filled with zeroes. The IFFT synthesizes 54 tones in the time domain, each tone having amplitude and phase modified according to the corresponding complex coefficient. The IFFT block 405 outputs 64 time domain samples incorporating the original 52 OFDM subcarriers and redundant data subcarriers appended at either end of the OFDM profile. The output of the IFFT block 405 is provided to a TX processor 407 for performing TX processing according to existing 802.11a processing as known to those skilled in the art, except operating with the appended duplicate subcarriers. The output of the TX processor 407 is provided to one input of an up-converter mixer 409, which receives a carrier signal at a second input from a 20 PPM oscillator 410. The mixer 409 performs RF mixer functions to up-convert the baseband signal to an RF TX signal, which is then amplified for transmission in a wireless medium. It is appreciated that the TX data symbol subcarrier processing for the appended redundant 10 MHz OFDM subcarrier packet structure profile is minimally modified by adding block 411 to duplicate complex coefficients for generating the appended duplicate subcarriers for IFFT processing by block 405.

Figure 5:
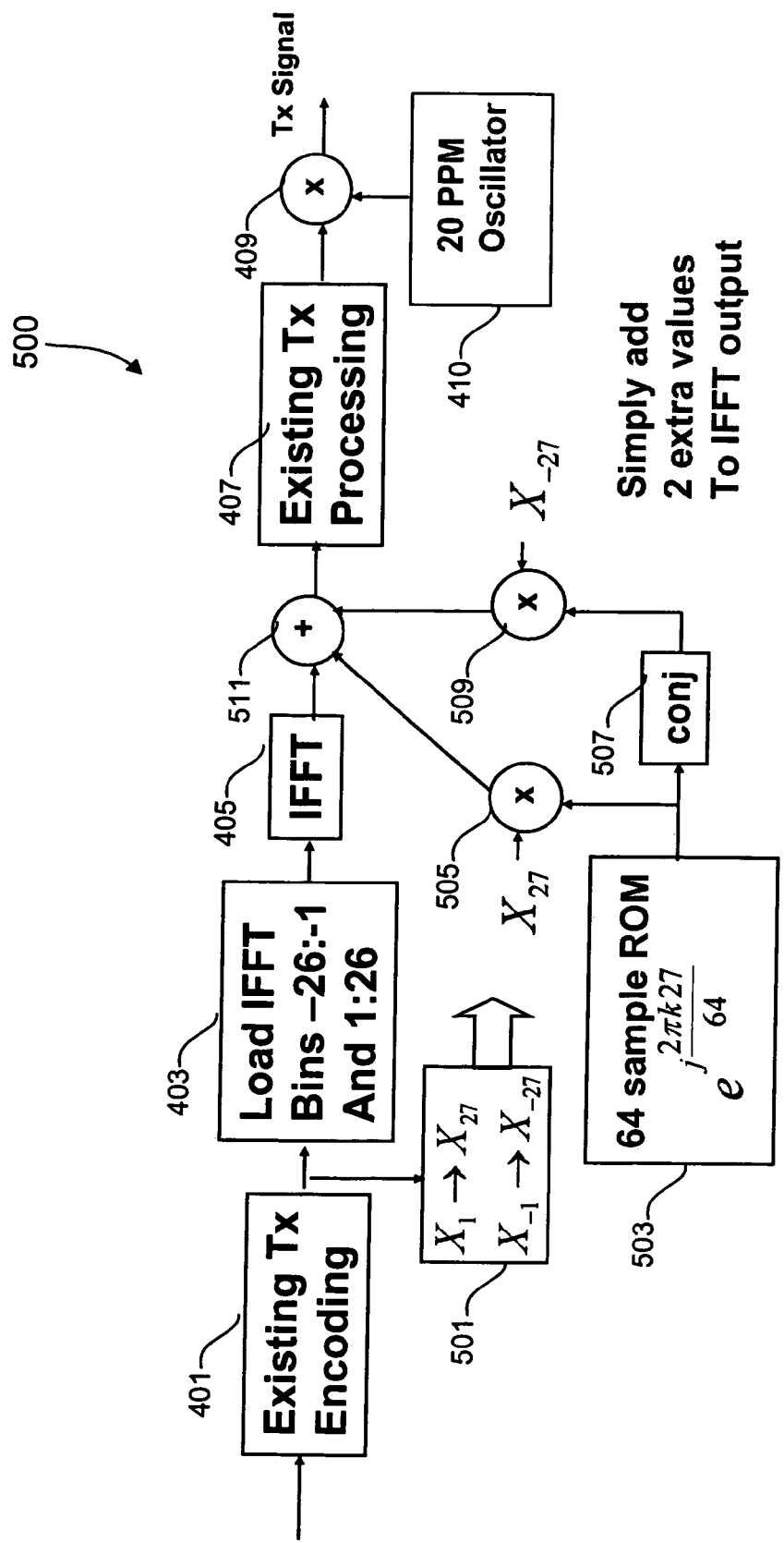
FIG. 5 is a simplified block diagram illustrating a TX data symbol subcarrier processor for the appended redundant 10 MHz OFDM subcarrier packet structure profile in accordance with an alternative embodiment of the present invention.

FIG. 5 is a simplified block diagram illustrating a TX data symbol subcarrier processor 500 for the appended redundant 10 MHz OFDM subcarrier packet structure profile in accordance with an alternative embodiment of the present invention. The TX data symbol subcarrier processor 500 is similar to the processor 400 in which similar components assume identical reference numbers. In this case, components 401, 403, 405, 407, 409 and 410 are included and operate in substantially the same manner and represent existing 802.11a transmit circuitry operated at half-rate using the 20 PPM oscillator 410. In this case, however, the IFFT 405 is loaded with the standard 52 complex coefficients −26:−, 1:26 with the remaining 12 bins (−32:−27, +27:+32) loaded with zeroes and performs the IFFT without the appended coefficients. The IFFT block 405 outputs 64 time domain samples incorporating the standard 52 subcarriers.

A duplication block 501 is added in which the complex coefficients from the TX encoder 401 associated with IFFT bins +1 and −1 are copied as complex coefficients $X_{27}$ and $X_{-27}$, respectively. A memory device 503 stores 64 time domain samples of a tone corresponding to the positive-frequency subcarrier 27. The subscript "k" in the superscript denotes an index value varied from 0 to 63 to generate the 64 samples. The samples output from the memory device 503 are provided to a first multiplier 505, which multiples the samples by the complex coefficient $X_{27}$ to generate 64 time domain samples corresponding to the positive-frequency subcarrier 27. The samples output from the memory device 503 are also provided to a conjugate block 507, which outputs 64 time domain samples corresponding to the negative-frequency subcarrier 27. The samples output from the conjugate block 507 are provided to a second multiplier 509, which multiples the samples by the complex coefficient $X_{-27}$ to generate 64 time domain samples corresponding to the negative-frequency subcarrier $-27$. The 64 outputs from the IFFT block 405 are added to the 64 samples from each of the multipliers 505, 509 by an adder 511 to generate 64 time domain samples incorporating the 54 subcarriers including the appended duplicate subcarriers $-27$ and $+27$. The output of the adder 511 is provided to block 407, which performs existing TX processing as previously described.

The memory device 503 may be implemented in any standard manner, such as a read-only memory (ROM) or the like. The 64 time domain samples of the tone corresponding to the positive-frequency subcarrier 27 are predetermined and stored within the memory device 503 and read out in the appropriate order for generating the time domain samples for the positive-frequency subcarrier 27. The time domain samples for the negative-frequency subcarrier $-27$ are generated using the conjugates of the time domain samples for the positive-frequency subcarrier 27.

Figure 6:
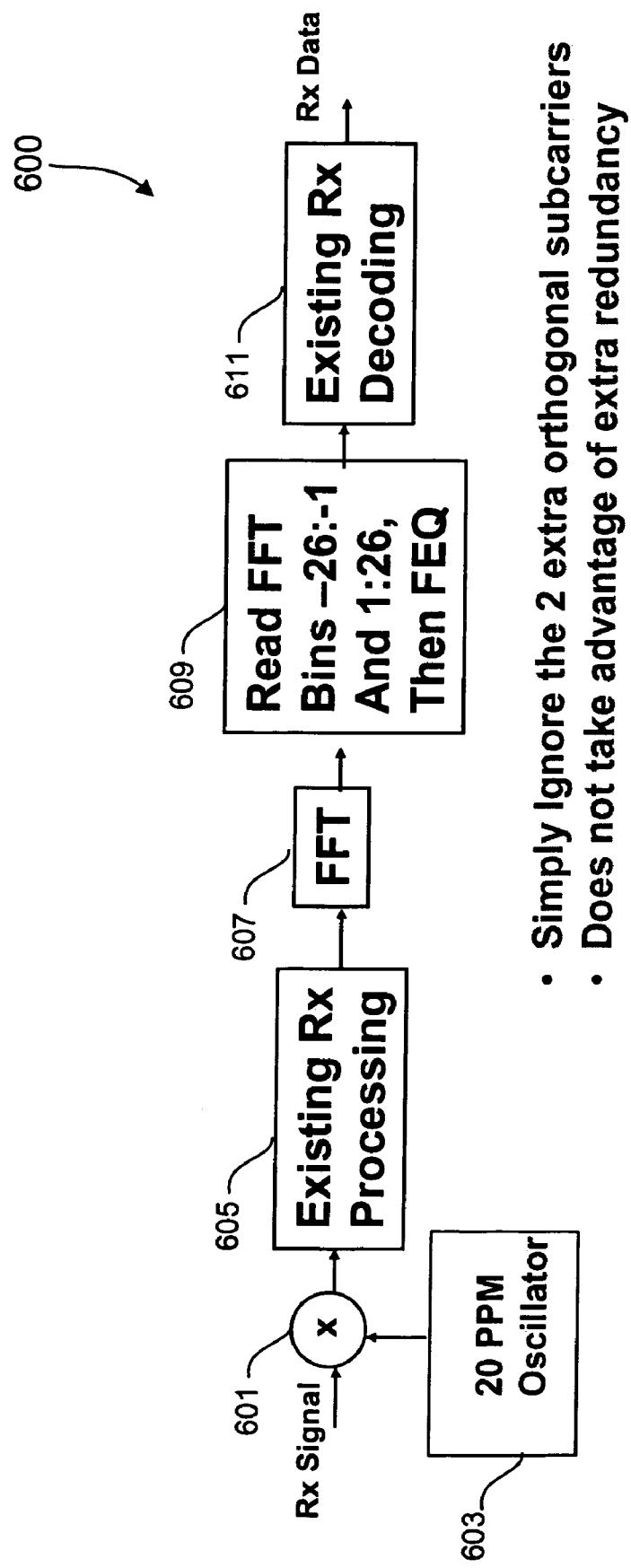
FIG. 6 is a simplified block diagram illustrating a receive (RX) data symbol subcarrier processor for the appended redundant 10 MHz OFDM subcarrier packet structure profile in accordance with an exemplary embodiment of the present invention.

FIG. 6 is a simplified block diagram illustrating a receive (RX) data symbol subcarrier processor 600 for the appended redundant 10 MHz OFDM subcarrier packet structure profile in accordance with an exemplary embodiment of the present invention. The received RX signal is down-converted by a mixer 601, which receives a receive carrier signal from a 20 PPM oscillator 603. The down-converted signal is provided to RX processor block 605, which performs receive processing in accordance with existing 802.11a processing. The output of block 605 is provided to IFFT block 607 for FFT conversion. The output of FFT block 607 is provided to block 609, in which the FFT bins $-26$:$-1$ and $1$:$26$ are read as usual for the standard 52 subcarrier OFDM, and then provided to a frequency domain equalizer (FEQ) to remove amplitude and phase distortion. The output of block 609 is provided to an RX decoder 611, which performs decoding according to existing 802.11a processing to provide the RX data as known to those skilled in the art.

It is appreciated that the RX data symbol subcarrier processor 600 is unmodified in which the two extra orthogonal subcarriers are simply ignored. The processor 600 does not take advantage of the extra redundancy, so that performance is not maximized. Nonetheless, the performance may be sufficient for certain configurations.

Figure 7:
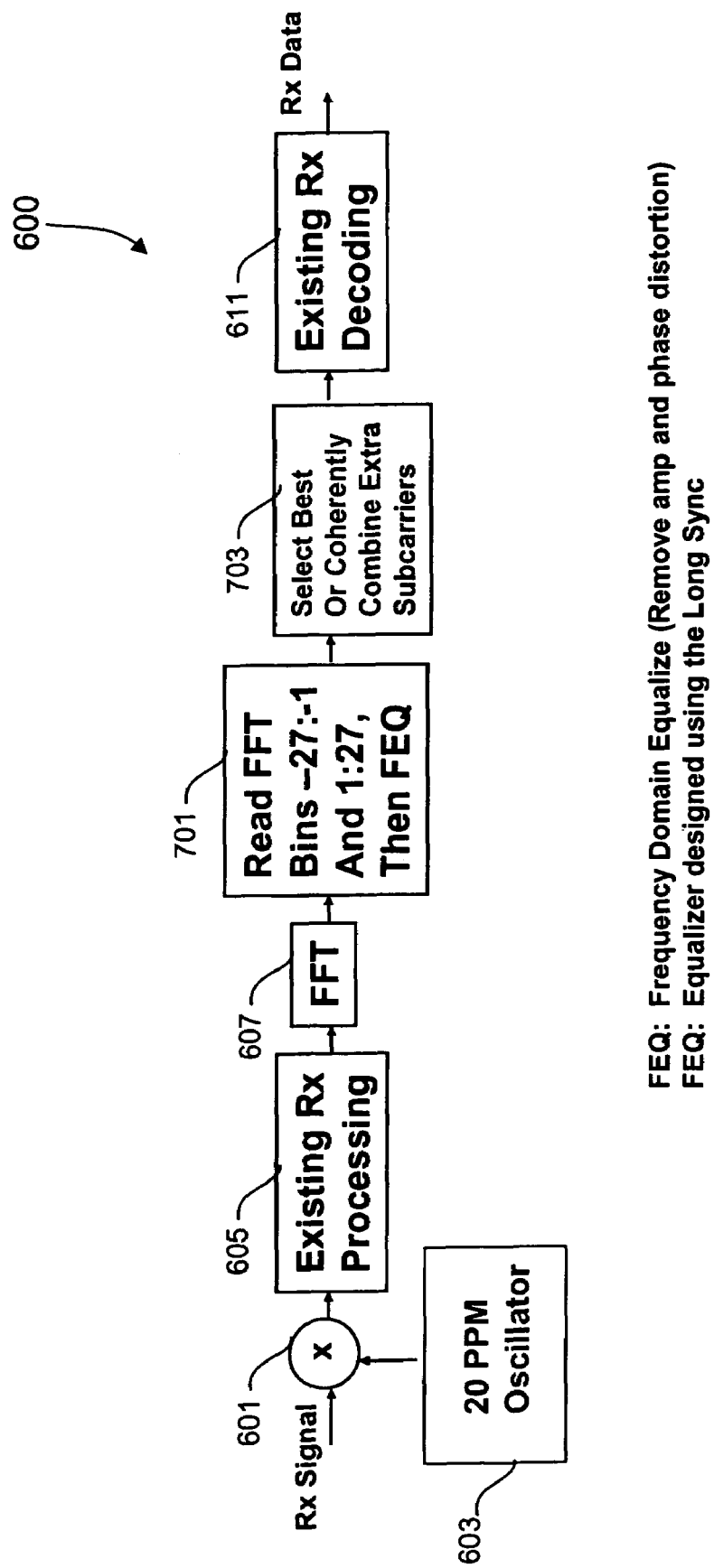
FIG. 7 is a simplified block diagram illustrating an RX data symbol subcarrier processor for the appended redundant 10 MHz OFDM subcarrier packet structure profile in accordance with an alternative embodiment of the present invention.

FIG. 7 is a simplified block diagram illustrating an RX data symbol subcarrier processor 700 for the appended redundant 10 MHz OFDM subcarrier packet structure profile in accordance with an alternative embodiment of the present invention. The processor 700 is similar to the processor 600 in which similar components assume identical reference numbers. The initial devices 601, 603, 605 and 607 are included and operate in the same manner for converting the received RX signal into the 64 complex samples at the output of the FFT block 607. In this case, however, the output of IFFT block 607 is provided to block 701, in which the 54 IFFT bins $-27$:$-1$ and $1$:$27$ are read for the appended duplicate 10 MHz OFDM subcarrier packet structure profile, and then provided to a frequency domain equalizer (FEQ) to remove amplitude and phase distortion. The output of block 701 is provided to block 703, which extracts selected information from the 54 bins. The output of block 703 is provided to the RX decoder 611, which operates as previously described.

The block 703 may be implemented according to any one of several different embodiments. In one embodiment, the block 703 simply ignores the information from the innermost FFT bins $-1$ and $+1$ and instead substitutes the redundant information from the outermost subcarrier bins $-27$ and $+27$, respectively. Thus, if either of the bins $-1$ or $+1$ is corrupted, the information is ignored in favor of the redundant information at bins $-27$ and $+27$. In an alternative embodiment, block 703 selects the best subcarrier between $-1$ and $-27$ and between $+1$ and $+27$. This embodiment may enhance performance in the event that either one of the appended subcarriers $-27$ and $+27$ are also corrupted. In another embodiment, block 703 coherently combines the extra subcarriers $-1$ with $-27$ and $+1$ with $+27$ using a weighting function or the like. In this third case, even if both subcarriers $-1$ and $-27$ and/or $+1$ and $+27$ are somewhat corrupted, valid data may be retrieved providing additional robustness.

Figure 8:
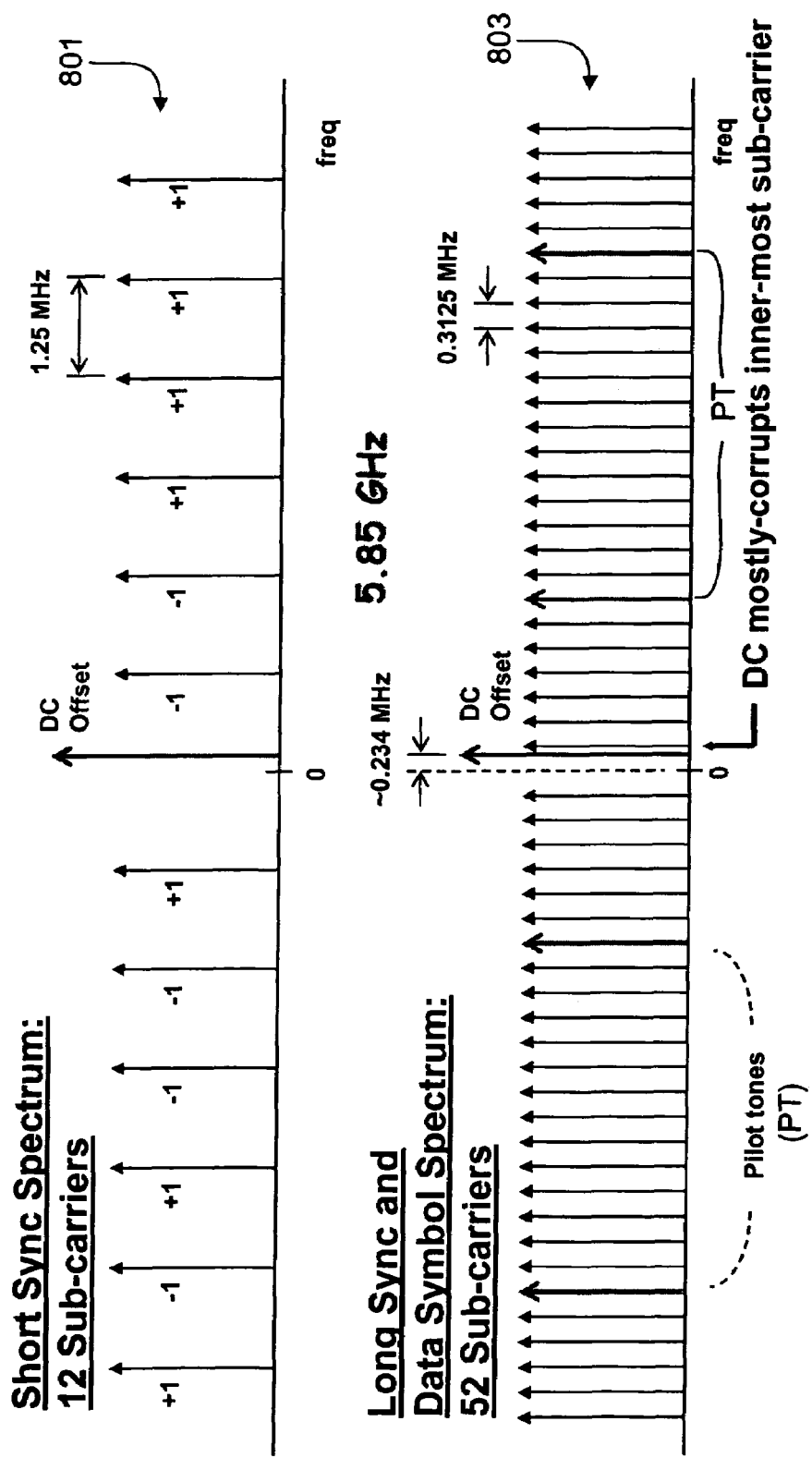
FIG. 8 shows a pair of graph diagrams for the 20 MHz 802.11a subcarrier packet structure profile with 40 PPM end-to-end frequency offset at 5.85 GHz.

FIG. 8 shows a pair of graph diagrams for the 20 MHz 802.11a subcarrier packet structure profile with 40 PPM end-to-end frequency offset at 5.85 GHz. The packet preamble starts with 10 repetitions of the short sync pattern, which can be used for coarse frequency offset (CFO) estimation. The first graph diagram shows the short sync spectrum 801 with 12 subcarriers with 1.25 MHz spacing and a corresponding DC offset near zero Hz. The 12 subcarriers include 6 positive-frequency subcarriers and 6 negative-frequency subcarriers distributed on either side of zero Hz leaving a gap of about 2.5 MHz at zero Hz. The level of end-to-end PPM is specified by the standards. The implementation of PPM can be positive or negative, so that the actual PPM lies anywhere between the maximum positive frequency offset magnitude and the maximum negative magnitude. For +/-40 PPM with end-to-end uncertainty, there is approximately +/-234 kHz of uncertainty at 5.85 GHz. The DC offset is shown with a maximum positive frequency offset at about 234 kHz. As illustrated by the first graph, the DC offset does not appreciably interfere with the short syncs given the relatively large short sync spacing.

The second graph diagram shows the long sync and data spectrum 803 with 52 subcarriers with 312.5 kHz spacing and a corresponding DC offset near zero Hz. The 52 subcarriers include 26 negative subcarriers and 26 positive subcarriers on either side of zero Hz leaving a gap of about 625 kHz at zero Hz. The 52 subcarriers include 48 data subcarriers and 4 pilot tones as known to those of ordinary skill in the art. Again, the DC offset is shown with a maximum positive offset at about 234 kHz, so that it mostly corrupts the inner-most positive subcarrier at 312 kHz. Of course, if the DC offset was located at the maximum negative magnitude, it would corrupt the inner-most negative subcarrier at $-312$ kHz. In either case, the inner-most subcarrier is separated from the DC offset by at least 78 kHz.

Figure 9:
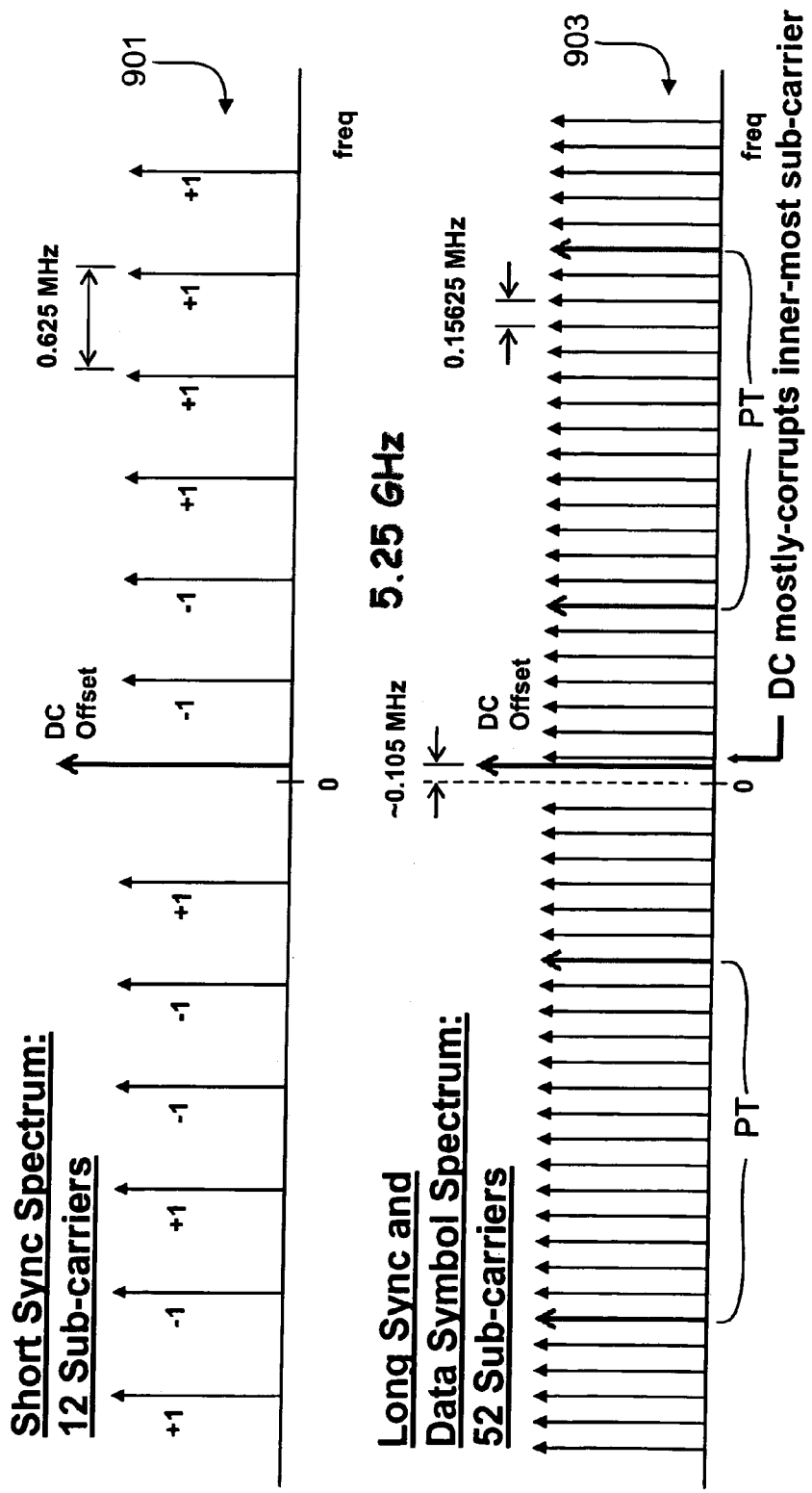
FIG. 9 shows a pair of graph diagrams for the 10 MHz 802.11j subcarrier packet structure profile with 20 PPM end-to-end frequency offset at 5.25 GHz.

FIG. 9 shows a pair of graph diagrams for the 10 MHz 802.11j subcarrier packet structure profile with 20 PPM end-to-end frequency offset at 5.25 GHz. The first graph of the short sync profile 901 shows that the short sync profile 1001 is not substantially effected. The second graph of the long sync and data subcarrier profile 903 shows the long sync and data subcarriers separated by 156.25 kHz. The DC offset is also shown with a maximum positive offset at about 105 kHz for the 5.25 GHz band. In this manner, the inner-most subcarrier at 156 kHz is separated from the DC offset by only about 51 kHz in the worst-case scenario.

Figure 10:
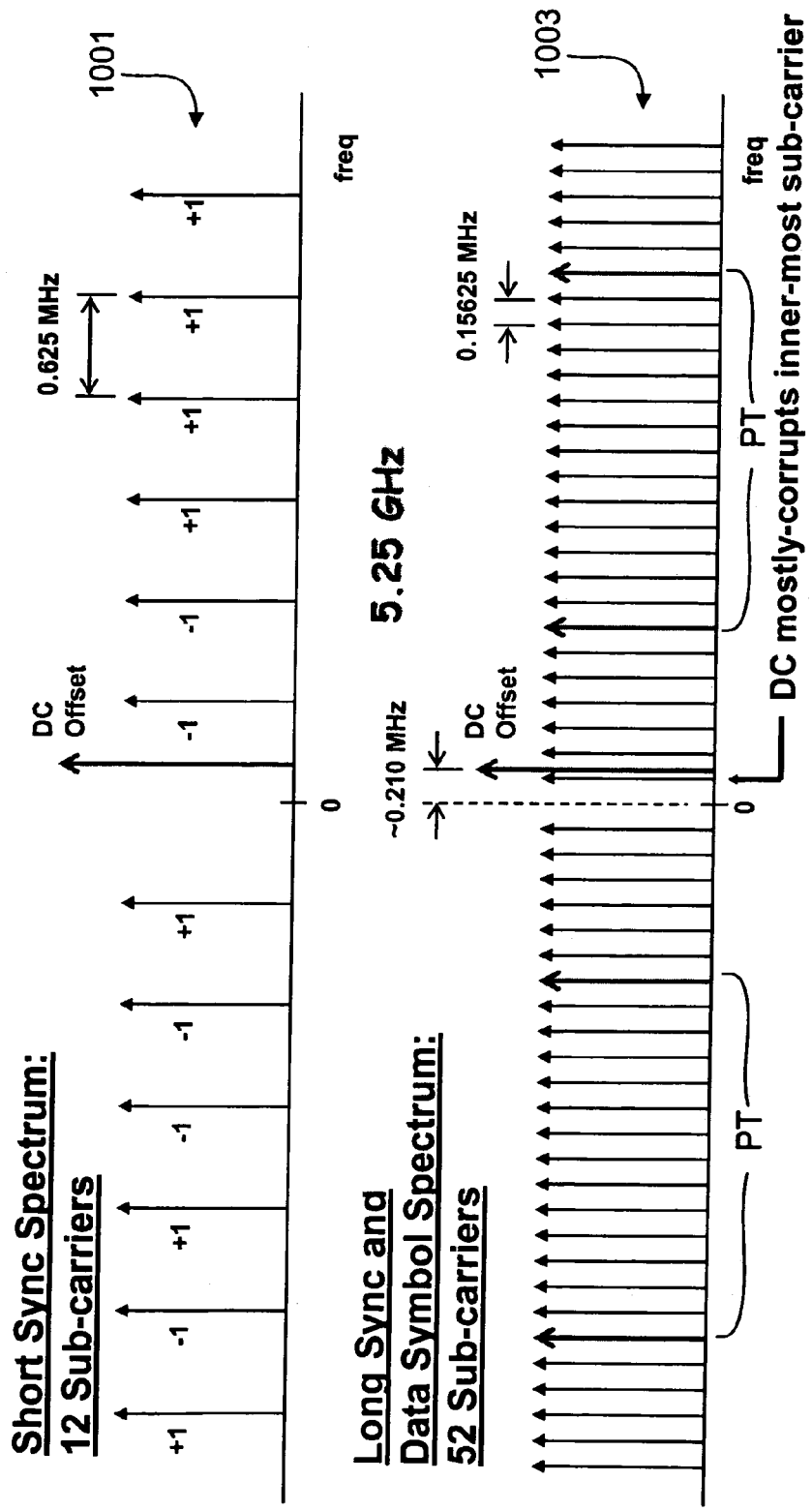
FIG. 10 shows a pair of graph diagrams for the 10 MHz 802.11j subcarrier packet structure profile with 40 PPM end-to-end frequency offset at 5.25 GHz.

FIG. 10 shows a pair of graph diagrams for the 10 MHz 802.11j subcarrier packet structure profile with 40 PPM end-to-end frequency offset at 5.25 GHz. The first graph shows that the short sync profile 1001 is not substantially effected. The second graph of the long sync and data subcarrier profile 1001 shows the long sync and data subcarriers separated by 156.25 kHz and the DC offset is shown with a maximum positive offset at about 210 kHz for the 5.25 GHz band. In this case, the DC offset can potentially overlap (and completely destroy) the inner-most subcarrier at 156 kHz.

Figure 11:
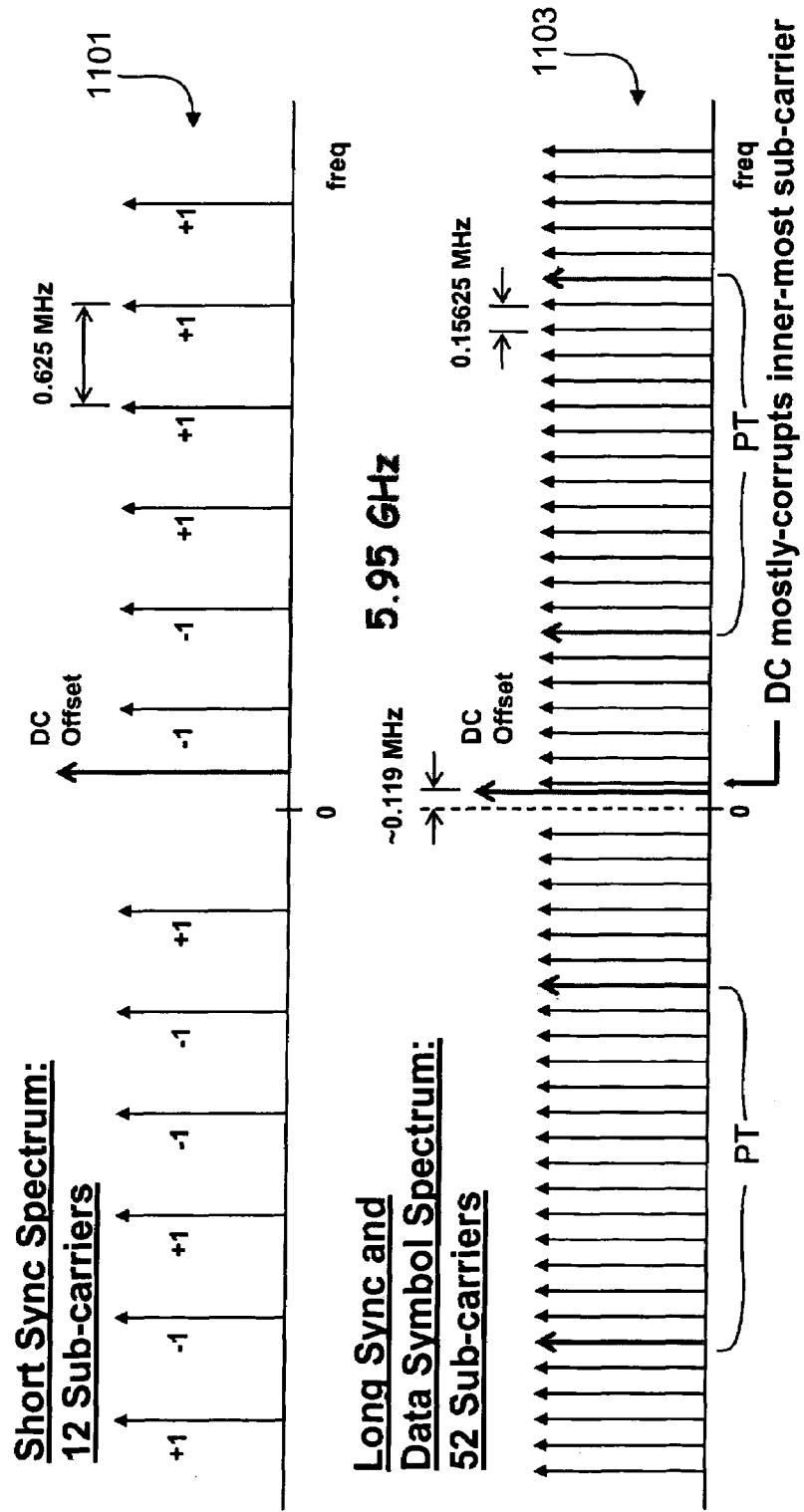
FIG. 11 shows a pair of graph diagrams for the 10 MHz DSRC subcarrier packet structure profile with 20 PPM end-to-end frequency offset at 5.95 GHz.

FIG. 11 shows a pair of graph diagrams for the 10 MHz DSRC subcarrier packet structure profile with 20 PPM end-to-end frequency offset at 5.95 GHz. The first graph shows the short sync profile 1101, which is not substantially effected. The second graph of the long sync and data subcarrier profile 1101 shows the long sync and data subcarriers separated by 156.25 kHz and the DC offset is shown with a maximum positive offset at about 119 kHz for the 5.95 GHz band. In this manner, the inner-most subcarrier at 156 kHz is potentially separated from the DC offset only by about 37 kHz in the worst-case scenario.

Figure 12:
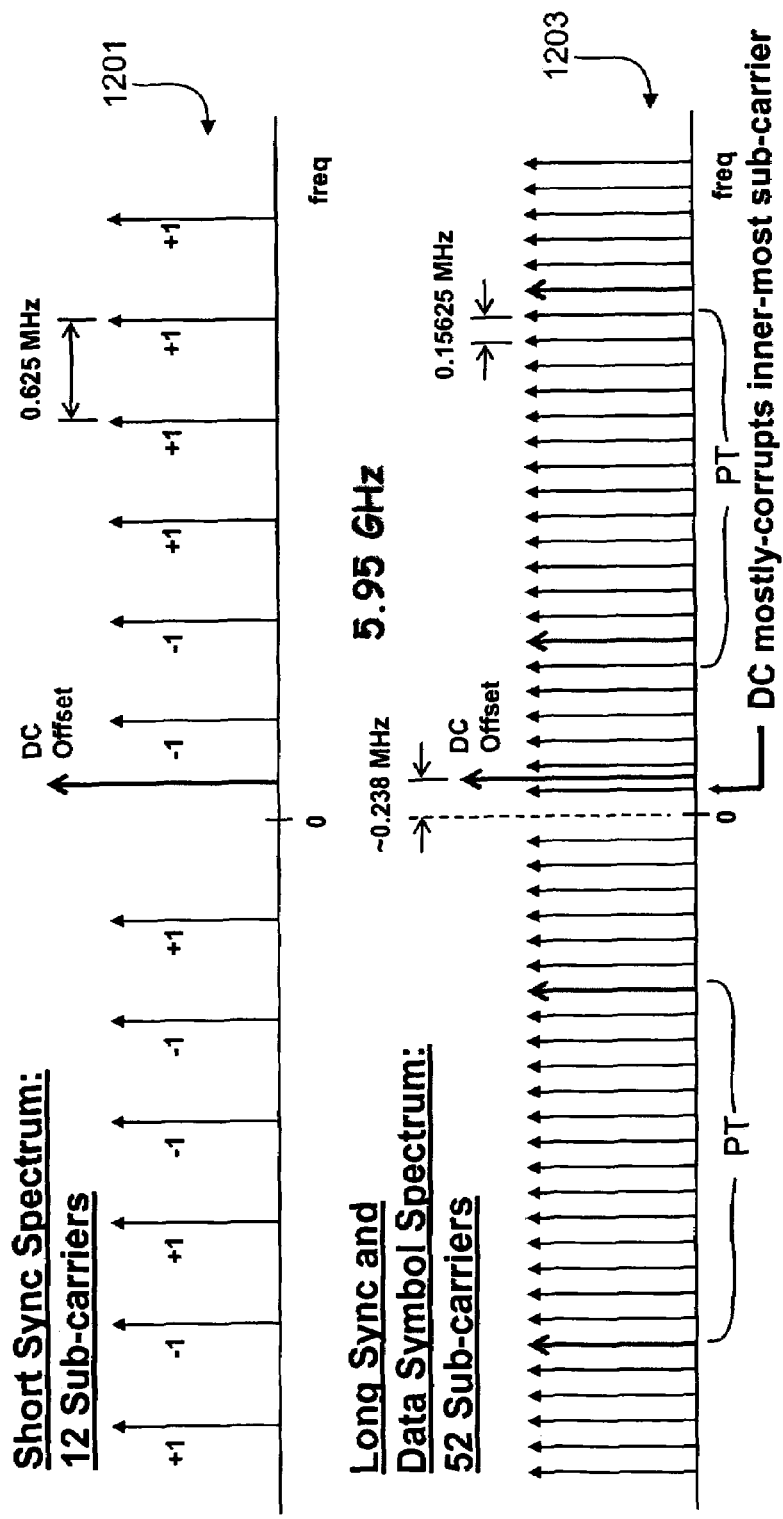
FIG. 12 shows a pair of graph diagrams for the 10 MHz DSRC subcarrier packet structure profile with 40 PPM end-to-end frequency offset at 5.95 GHz.

FIG. 12 shows a pair of graph diagrams for the 10 MHz DSRC subcarrier packet structure profile with 40 PPM end-to-end frequency offset at 5.95 GHz. The first graph shows that the short sync profile 1201 is not substantially effected. The second graph of the long sync and data subcarrier profile 1201 shows the long sync and data subcarriers separated by 156.25 kHz and the DC offset is shown with a maximum positive offset at about 238 kHz for the 5.95 GHz band. In this case, the DC offset can potentially overlap (and completely destroy) the inner-most subcarrier at 156 kHz.

Figure 13:
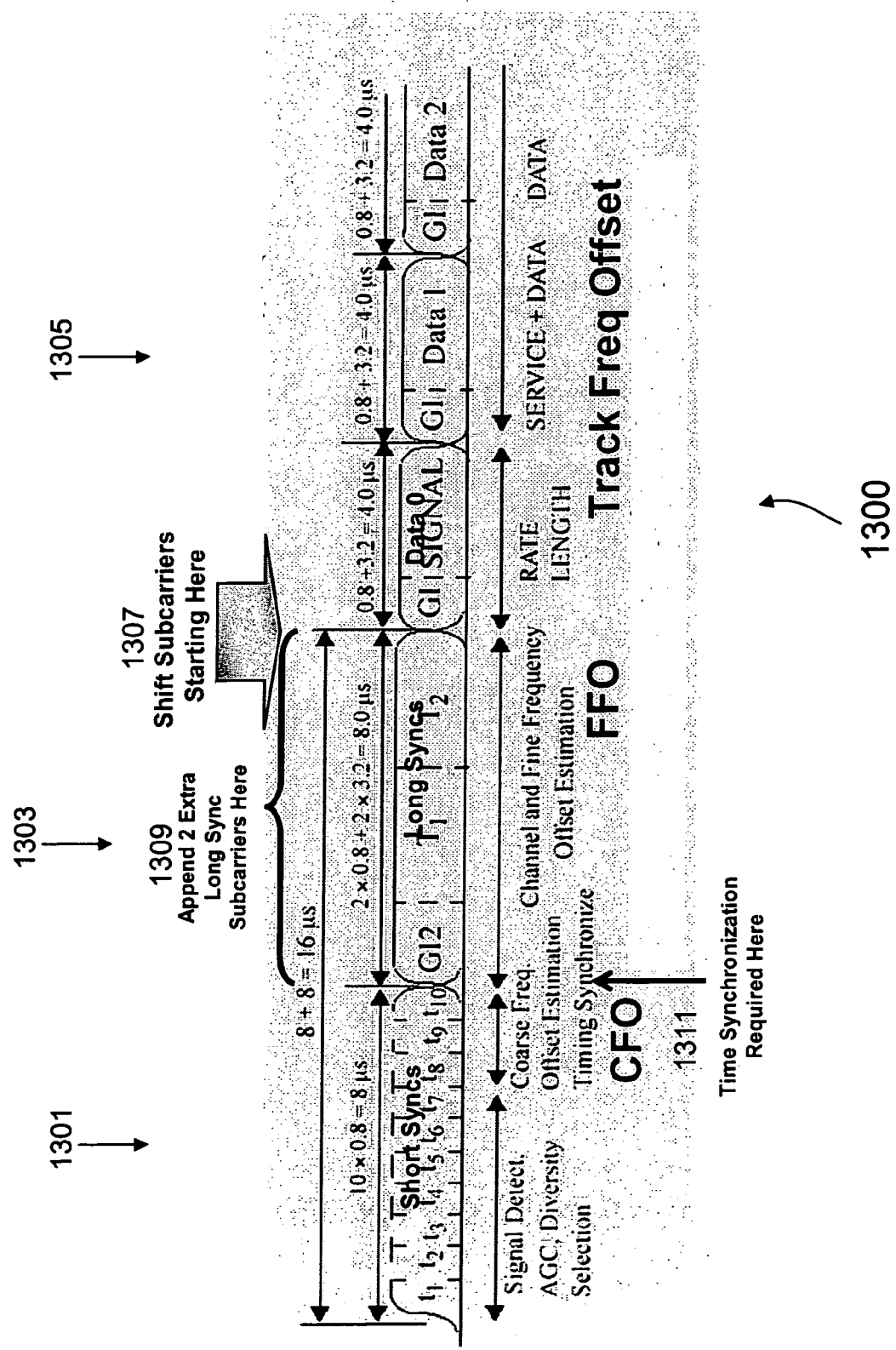
FIG. 13 is a figurative diagram of a shifted subcarrier OFDM packet symbol structure in accordance with an exemplary embodiment of the present invention.

FIG. 13 is a figurative diagram of a shifted subcarrier OFDM packet symbol structure 600 in accordance with an exemplary embodiment of the present invention. The shifted subcarrier OFDM packet symbol structure 1300 is similar to the standard structure and includes a short sync (SS) section 1301, followed by a long sync (LS) section 1303, followed by remaining packet portions 1305 (only partially depicted). The SS section 1301 includes 10 consecutive short syncs labeled t1, t2, t3, ..., t10 each being 800 nanoseconds (ns) in duration for a total of 8 microseconds (μs). The LS section 1303 includes a 1.6 μs guard interval GI2 followed by a pair of 3.2 μs long syncs labeled T1 and T2. The remaining packet portions 1305 include data symbols 0, 1, 2, etc., each beginning with an 800 ns guard interval GI. As described further below, the subcarriers of the data signals beginning after the LS section 1303, as shown at 1307, are shifted outward by one fast-fourier transform (IFFT) bin. Also, as shown at 1309, 2 extra subcarriers are appended to each of the long syncs as further described below. Time synchronization is shown at 1311 illustrating the CFO estimation processing for short sync to long sync transition time alignment.

Figure 14:
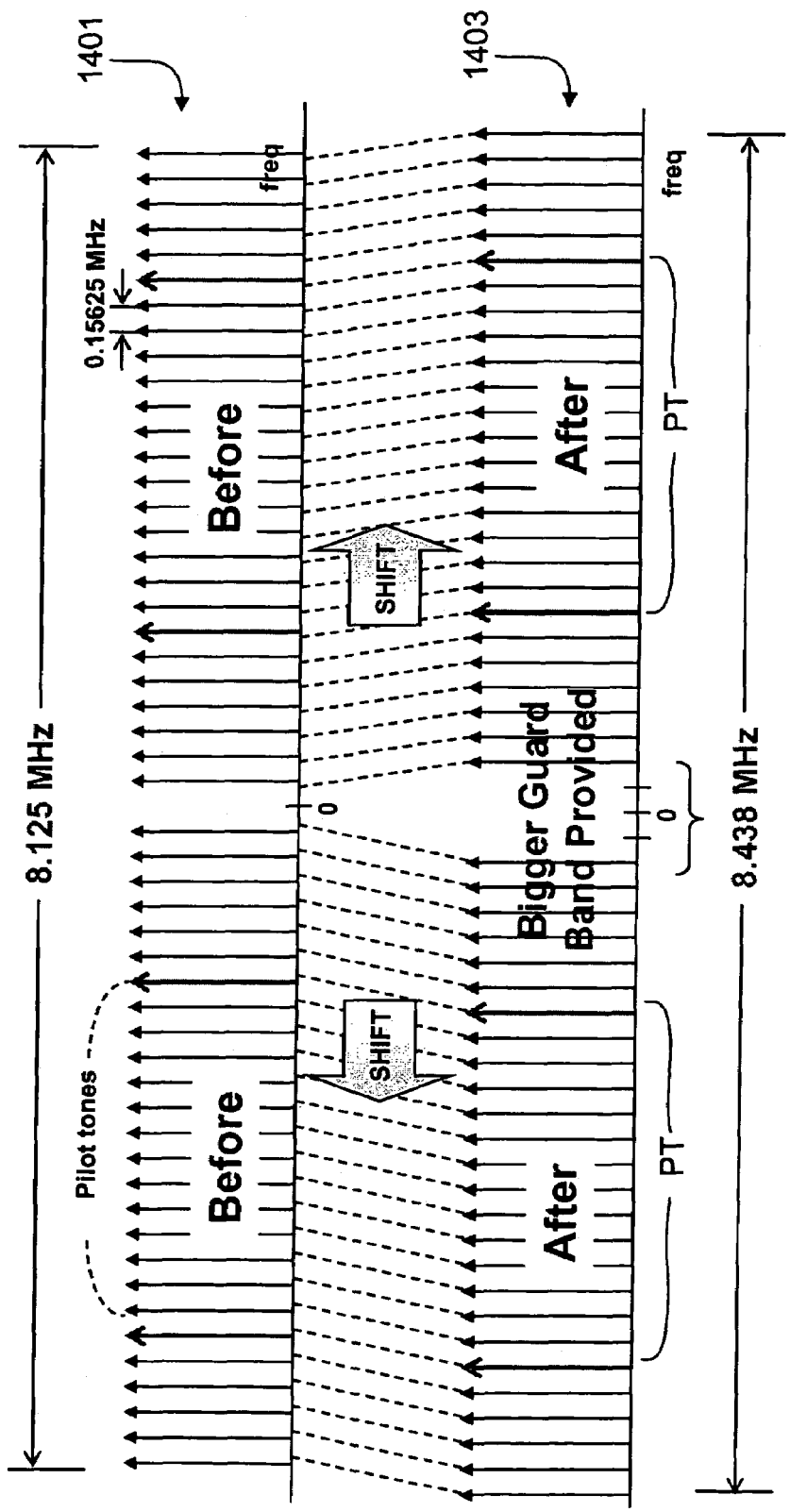
FIG. 14 is a graph diagram of a 10 MHz OFDM subcarrier packet structure profile before and after subcarrier shifting in accordance with an exemplary embodiment of the present invention.

FIG. 14 is a graph diagram of a 10 MHz OFDM subcarrier packet structure profile before and after subcarrier shifting in accordance with an exemplary embodiment of the present invention. The four pilot tones PT are still available and are shifted outward by one position. Only a low-cost IFFT and IFFT indexing modification is necessary to implement the subcarrier shifting. The original subcarrier packet structure profile is shown at 1401 and the shifted subcarrier packet structure profile is shown at 1403. In particular, the positive frequency subcarriers 1 to 26 (or 1:26) are shifted up by one frequency separation notch or IFFT bin to become positive frequency subcarriers 2 to 27 (or 2:27). The negative frequency subcarriers −26 to −1 (or −26:−1) are shifted down by one frequency separation notch or IFFT bin to become negative frequency subcarriers −27 to −2 (or −27:−2). Consequently, there is approximately a 4% increase (2/52) in the overall bandwidth with a small increase in adjacent channel interference. The bandwidth increases from about 8.125 MHz to about 8.438 MHz. The transmit (TX) spectral mask is slightly modified. The TX subcarrier flatness requirement (currently +/−2 dB for subcarriers −16:−1 & 1:16 and +2/−4 dB for −26:−17 & 17:26) may be modified slightly. The subcarrier spacing of about 156.25 kHz remains unchanged. As illustrated, a significantly larger guard band of +/−312.5 kHz is provided on either side of zero Hz for the profile 1403 as compared to the non-shifted profile of 1401.

Figure 15:
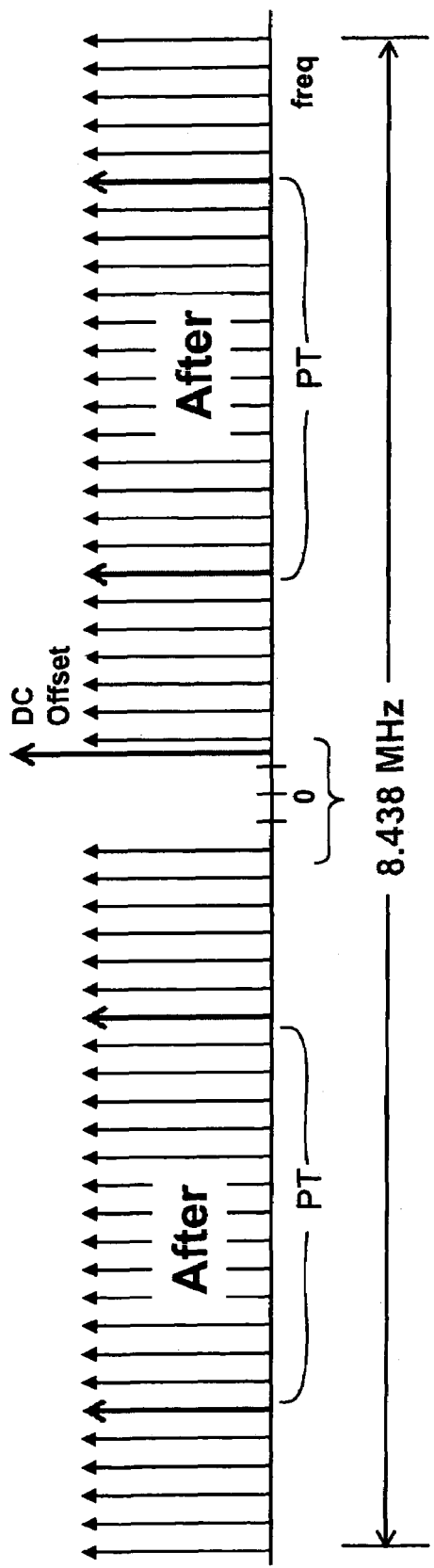
FIG. 15 is a graph diagram of the shifted 10 MHz OFDM subcarrier packet structure profile of FIG. 7 and a worst-case DC offset of about 238 kHz.

FIG. 15 is a graph diagram of the shifted 10 MHz OFDM subcarrier packet structure profile of FIG. 14 and a worst-case DC offset of about 238 kHz. The worst-case DC offset corresponds to the 10 MHz DSRC subcarrier profile with 40 PPM at 5.95 GHz as shown in FIG. 12. It is appreciated that the shifted 10 MHz OFDM subcarrier packet structure profile sufficiently moves the subcarriers away from the DC offset so that DC does not overlap any of the subcarriers for any of the 11j and DSRC cases illustrated in FIGS. 9-12.

Figure 16:
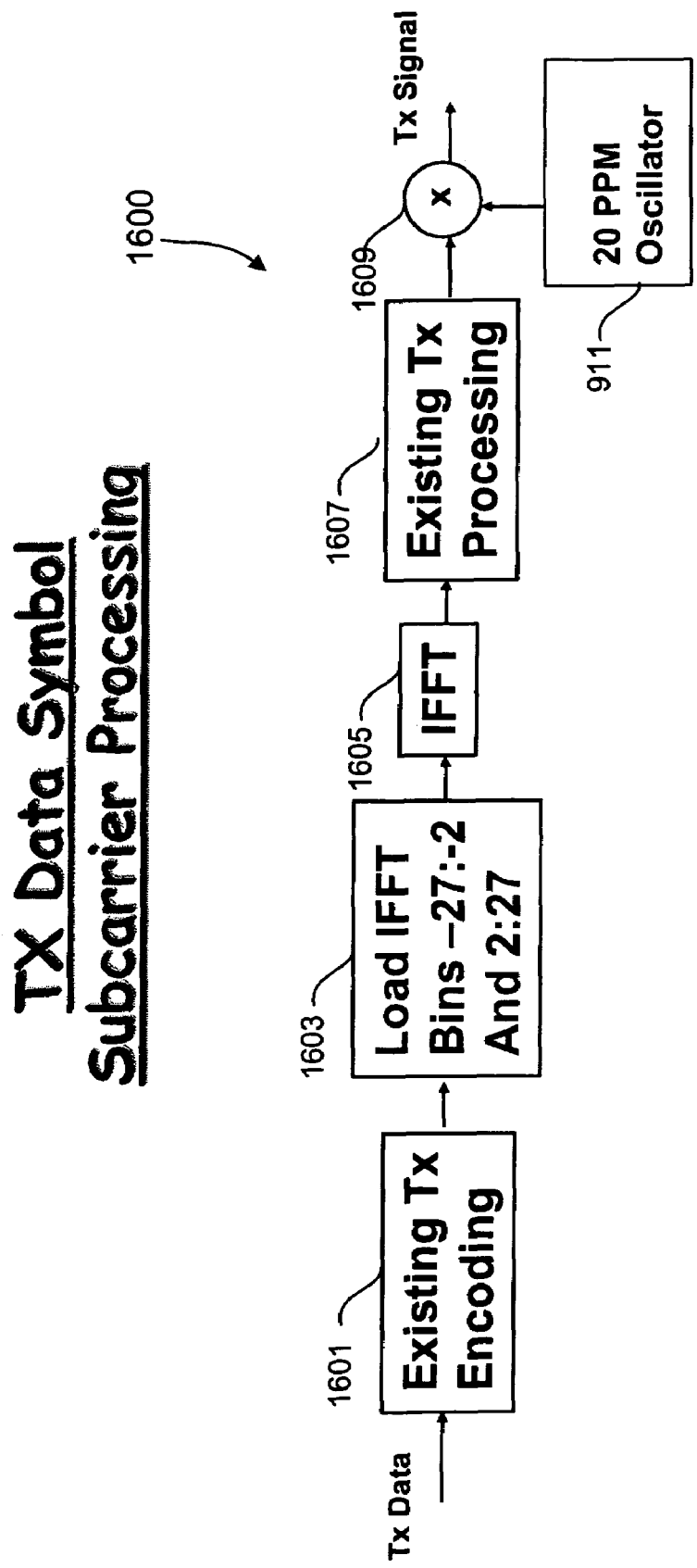
FIG. 16 is a simplified block diagram illustrating a transmit (TX) data symbol subcarrier processor for the shifted 10 MHz OFDM subcarrier packet structure profile in accordance with an exemplary embodiment of the present invention.

FIG. 16 is a simplified block diagram illustrating a transmit (TX) data symbol subcarrier processor 1600 for the shifted 10 MHz OFDM subcarrier packet structure profile in accordance with an exemplary embodiment of the present invention. The transmit data is encoded using an existing and unmodified TX encoder 1601. The encoded data from the encoder 1601 is provided to block 1603, in which the IFFT bins −27:−2 and 2:27 are loaded for the shifted subcarriers. The IFFT block 1605 performs IFFT processing in a similar manner as existing transmitters, except using shifted subcarriers. The output of IFFT block 1605 is provided to a TX processor 1607, which performs TX processing according to existing 802.11a processing as known to those skilled in the art. The output of the TX processor 1607 is provided to one input of an up-converter mixer 1609, which receives a carrier signal at a second input from a 20 PPM oscillator 1611. The mixer 1609 performs RF mixer functions to up-convert the baseband signal to an RF TX signal, which is then amplified for transmission in a wireless medium. It is appreciated that the TX data symbol subcarrier processing for the shifted 10 MHz OFDM subcarrier packet structure profile is minimally modified at block 1603 in which IFFT indexing is changed to shift the positive subcarriers up and the negative subcarriers down by one IFFT bin.

Figure 17:
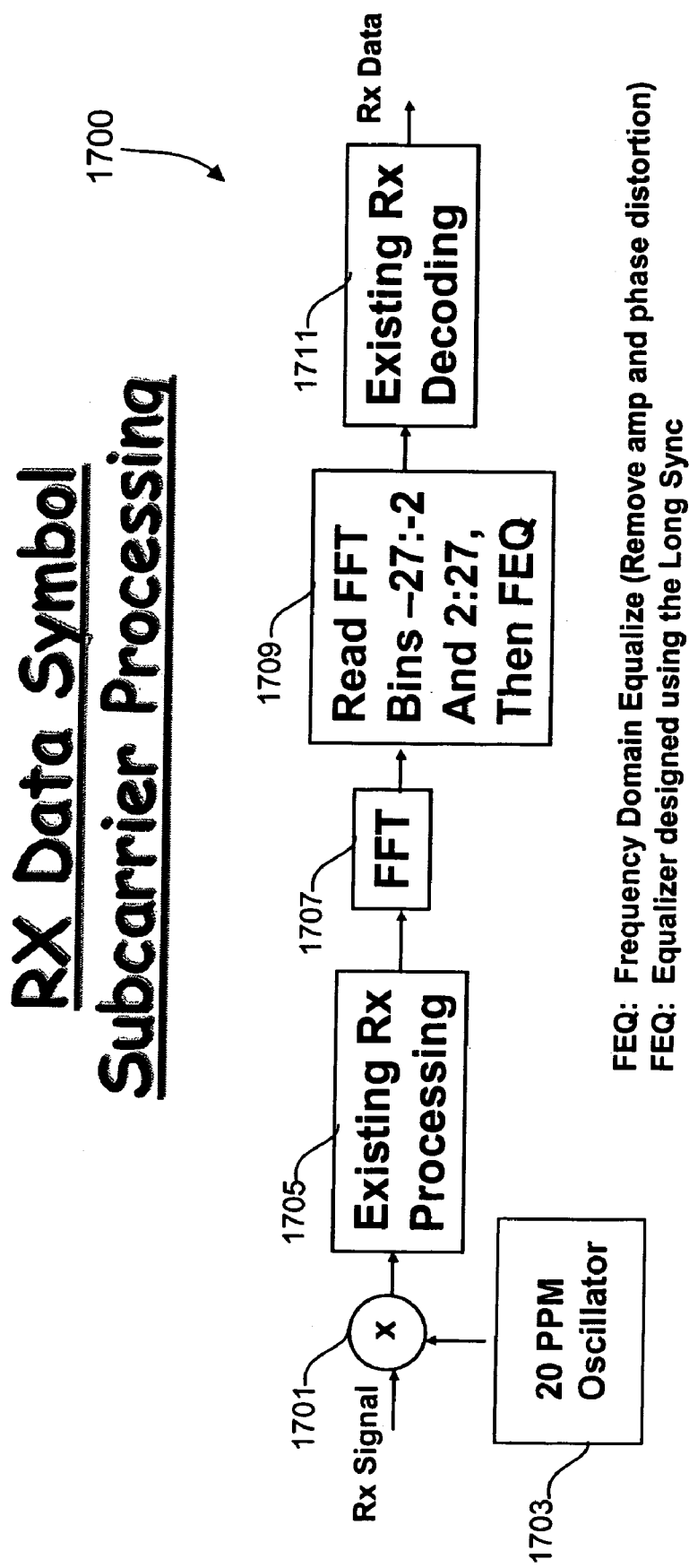
FIG. 17 is a simplified block diagram illustrating a receive (RX) data symbol subcarrier processor for the shifted 10 MHz OFDM subcarrier packet structure profile in accordance with an exemplary embodiment of the present invention.

FIG. 17 is a simplified block diagram illustrating a receive (RX) data symbol subcarrier processor 1700 for the shifted 10 MHz OFDM subcarrier packet structure profile in accordance with an exemplary embodiment of the present invention. The received RX signal is down-converted by a mixer 1701, which receives a receive carrier signal from a 20 PPM oscillator 1703. The down-converted signal is provided to RX processor block 1705, which performs receive processing in accordance with existing 802.11a processing. The output of block 1705 is provided to IFFT block 1707 for IFFT conversion. The output of IFFT block 1707 is provided to block 1709, in which the IFFT bins −27:−2 and 2:27 are read for the shifted 10 MHz OFDM subcarrier packet structure profile, and then provided to a frequency domain equalizer (FEQ) to remove amplitude and phase distortion. The FEQ is designed or otherwise the FEQ taps are programmed using the long syncs, which are further described below. The output of block 1709 is provided to an RX decoder 1711, which performs decoding according to existing 802.11a processing to provide the RX data as known to those skilled in the art. It is appreciated that the RX data symbol subcarrier processor 1000 for the shifted 10 MHz OFDM subcarrier packet structure profile is minimally modified at block 1709 in which FFT indexing is changed to shift the positive subcarriers up and the negative subcarriers down by one IFFT bin.

Figure 18:
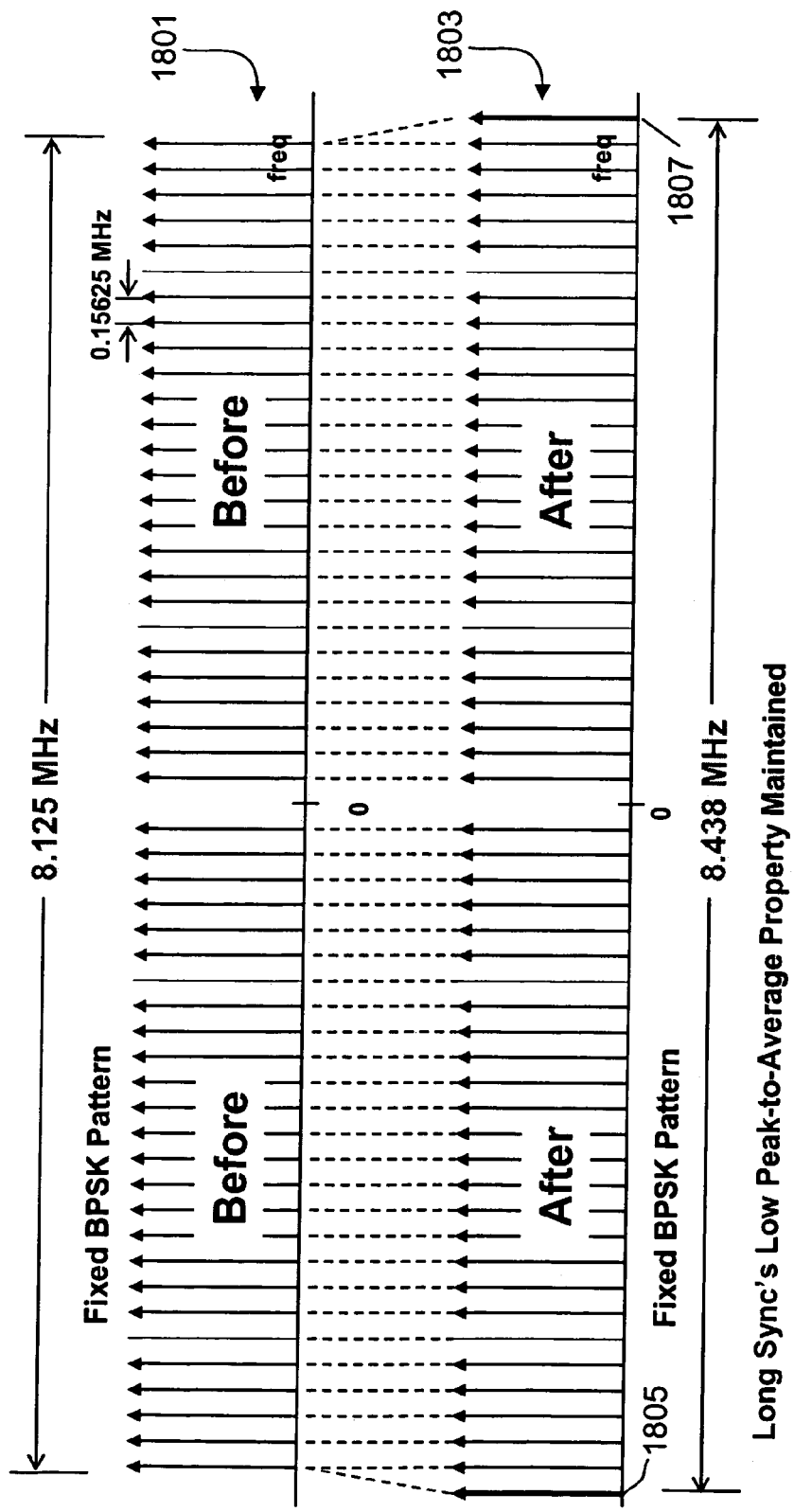
FIG. 18 is a graph diagram of a 10 MHz OFDM long sync subcarrier structure profile before and after appending two extra LS subcarriers in accordance with an exemplary embodiment of the present invention.

FIG. 18 is a graph diagram of a 10 MHz OFDM long sync subcarrier structure profile before and after appending two extra LS subcarriers in accordance with an exemplary embodiment of the present invention. It is noted that the short syncs are left unmodified. The original LS subcarrier structure profile is shown at 1801 and the appended LS subcarrier structure profile is shown at 1803. In particular, the positive and negative frequency subcarriers −26:−1 and 1:26 remain unmodified, a negative subcarrier 1805 is added at index position −27 and a positive subcarrier 1807 is added at index position 27. The existing LS pattern uses BPSK modulation. The two appended subcarriers 1805, 1807 use a predetermined BPSK modulation. Although it is possible to rescale the amplitudes of the subcarriers due to the two additional subcarriers, such rescaling is not necessary.

Figure 19:
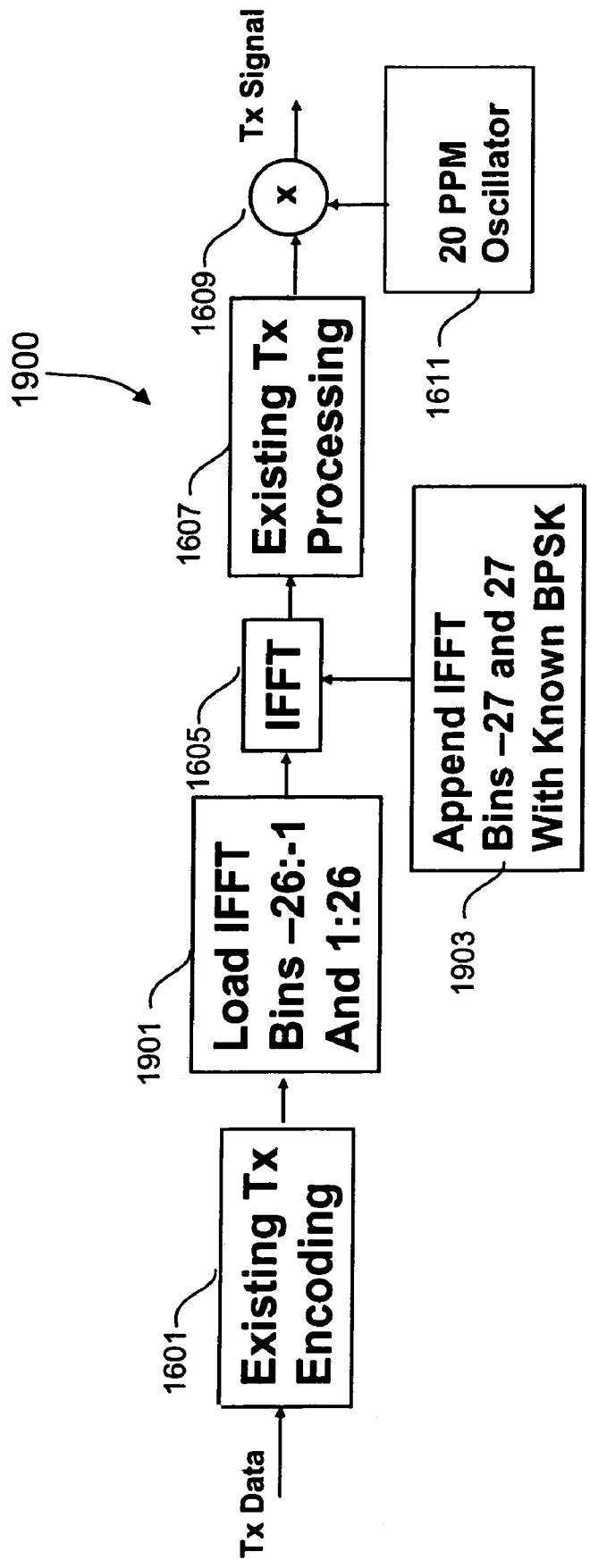
FIG. 19 is a simplified block diagram illustrating a TX long sync subcarrier processor for the shifted 10 MHz OFDM subcarrier packet structure profile in accordance with an exemplary embodiment of the present invention.

FIG. 19 is a simplified block diagram illustrating a TX long sync subcarrier processor 1900 for the shifted 10 MHz OFDM subcarrier packet structure profile in accordance with an exemplary embodiment of the present invention. The processor 1900 is similar to the processor 1600 in which similar blocks assume identical reference numbers. The TX data for the long syncs is processed by the TX encoder 1601 in similar manner and encoded data is provided to block 1901. The IFFT bins −26:−1 and 1:26 are loaded as is normally the case for the LS subcarriers for standard OFDM as shown at block 1901. In this case, a block 1903 is added which appends and loads subcarriers for IFFT bins −27 and 27 with the predetermined BPSK modulation. The IFFT block 905 performs IFFT processing as previously described, and the output is provided to the TX processor 1607. The outputs of the TX processor 1607 and of the 20 PPM oscillator 1611 are provided to the mixer 1609, which outputs the TX signal as previously described. It is appreciated that the TX long sync subcarrier processor 1900 is minimally modified at blocks 1903 and 1605 in which two subcarriers are appended at the outer bin locations. Otherwise, transmit processing according to 802.11a is substantially unmodified.

Figure 20:
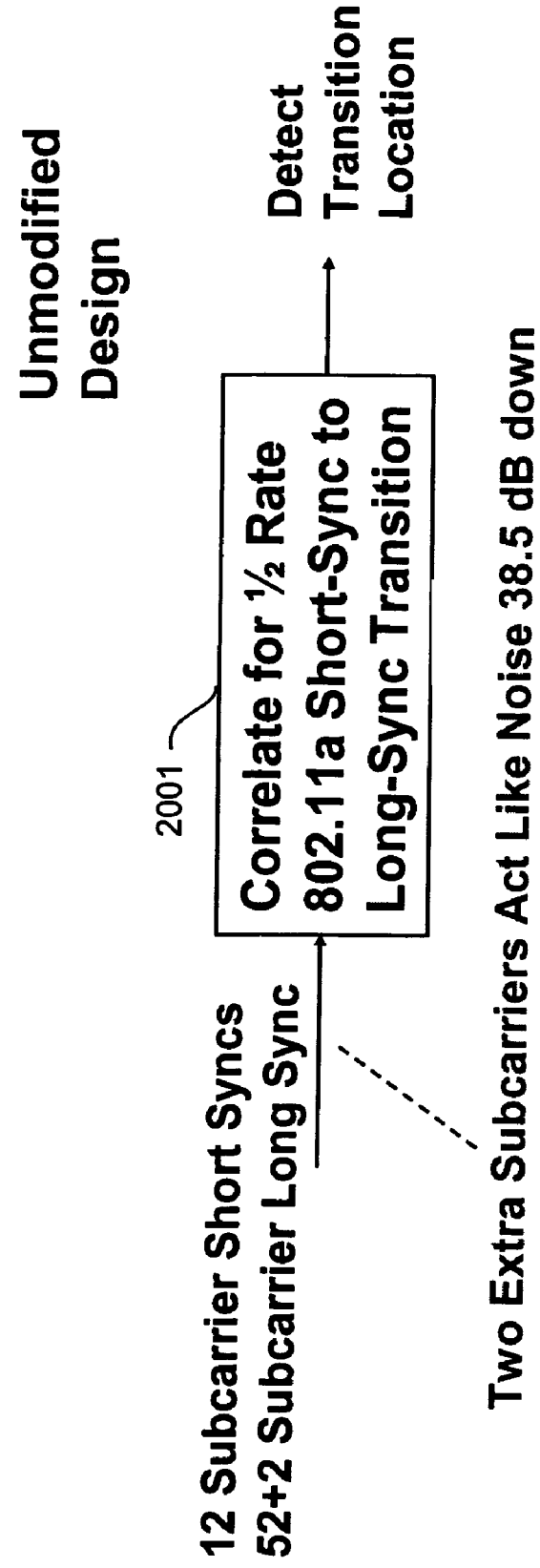
FIG. 20 is a simplified block diagram of an RX time synchronization correlation processor, which detects the location of the transition between the 12 subcarrier short syncs and the 54 subcarrier long syncs in accordance with exemplary embodiments of the present invention.

FIG. 20 is a simplified block diagram of an RX time synchronization correlation processor 2001, which detects the location of the transition between the 12 subcarrier short syncs and the 54 subcarrier long syncs in accordance with exemplary embodiments of the present invention. The two appended subcarriers 1805, 1807 act as extra noise, calculated as $10 \log_{10}(2/52)$, which is approximately −38 dB. The appended subcarriers act as a noise source generating an insignificant amount of noise, so that the time synchronization is effectively unhindered. In this manner, processor 2001 represents an unmodified design in which correlation for determining the transition from short sync to long sync is performed at one-half the rate of a similar processor for 802.11a.

Figure 21:
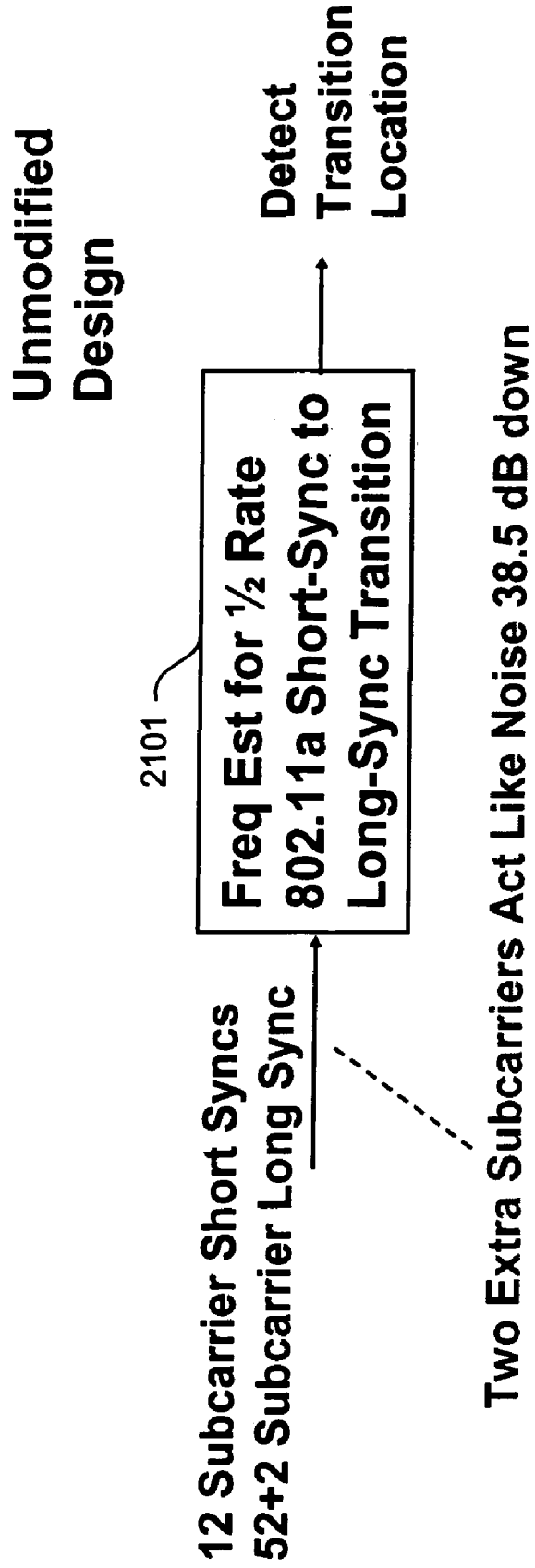
FIG. 21 is a simplified block diagram of an RX FFO estimation circuit in accordance with exemplary embodiments of the present invention.

FIG. 21 is a simplified block diagram of an RX FFO estimation circuit 1401 in accordance with exemplary embodiments of the present invention. The long sync is a periodic waveform with a first half (LS1) and a second half (LS2). The circuit 2101 essentially compares the relative phase rotation between the first and second halves to determine the frequency offset. The shifting of the subcarriers otherwise changes the periodic nature of the long syncs, which might otherwise complicate the FFO estimation circuitry. Instead, the inner subcarriers are retained and a pair of subcarriers are added on either end of the standard OFDM subcarrier profile. This enables retention of the periodic properties of the long syncs, which further enables employment of the existing FFO estimation circuitry. The circuit 2101 illustrates that the existing FFO estimation circuitry is retained and operated at half rate to determine a frequency estimate for half-rate 802.11a short sync to long sync transition.

Figure 22:
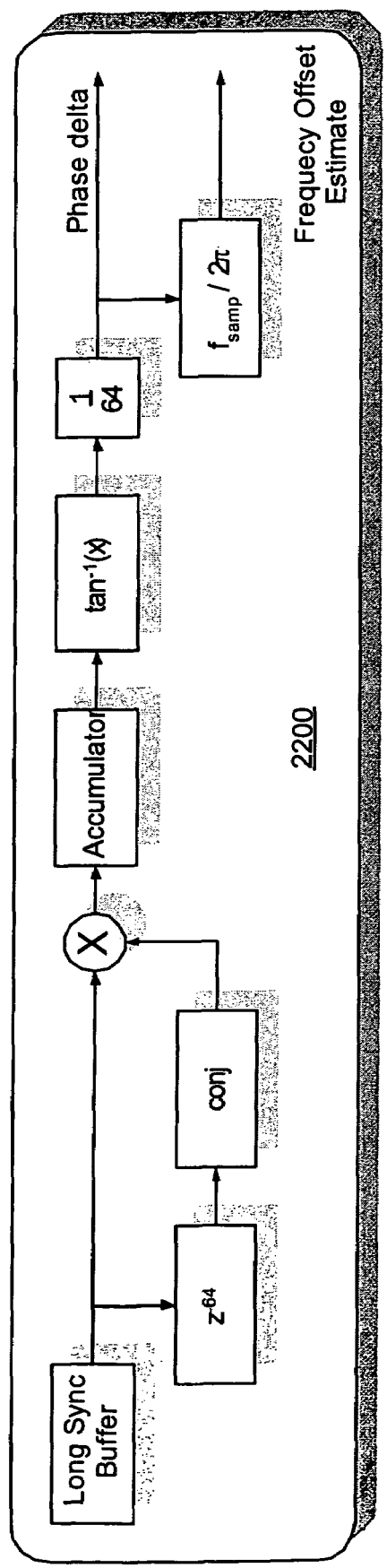
FIG. 22 is a simplified schematic diagram illustrating an FFO estimation circuit in which there is little or no degradation.

FIG. 22 is a simplified schematic diagram illustrating an FFO estimation circuit 2200 in which there is little or no degradation. In this case, a delay and multiplier FFO estimator exploits the periodic nature of the signal. The two additional subcarriers appended at the ends of the subcarrier profile do not destroy the periodic property, so that there is no FFO estimation loss.

Figure 23:
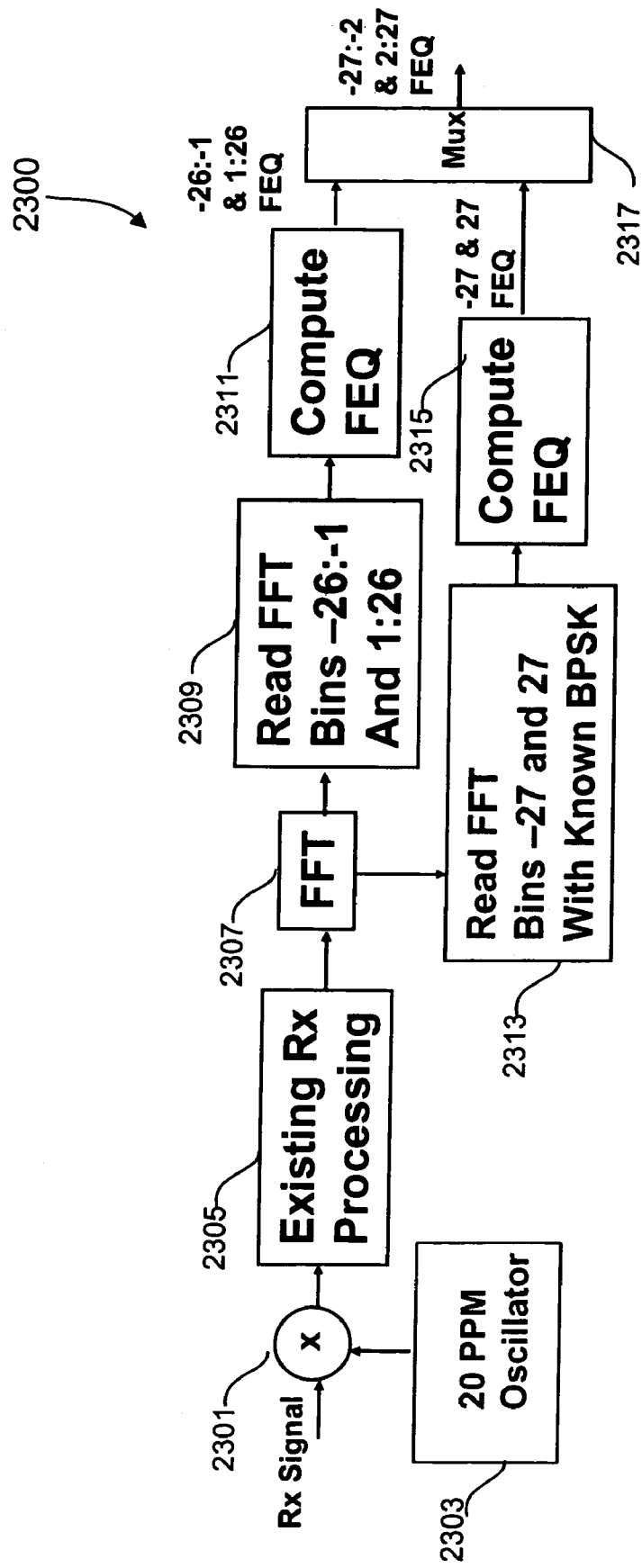
FIG. 23 is a simplified block diagram of RX long sync FEQ estimation circuit according to an exemplary embodiment of the present invention.

FIG. 23 is a simplified block diagram of RX long sync FEQ estimation circuit 2300 according to an exemplary embodiment of the present invention. The received signal is provided to one input of a down-converter mixer 2301, which receives the carrier signal output of a 20 PPM oscillator 2303 at its other input. The analog baseband output signal of the mixer 2301 is provided to existing RX process circuitry 2305 and then to FFT block 2307 for FFT conversion. The FFT bins −26:−1 and 1:26 are read at block 2309 and the FEQ is computed at block 2311. At block 2313, the appended FFF bins −27 and 27 of the appended subcarriers are read, and the corresponding FEQ is computed at 2315. The outputs of blocks 2311 and 2315 are provided to a multiplexer (MUX) 2317, which selects the FEQ for bins −27:−2 and 2:27. In effect, the bins associated with the inner subcarrier indexes −1 and +1 are discarded by the MUX 2317 to provide the FEQ output.

It is appreciated that the two appended subcarriers 1805, 1807 allow both low-complexity FFO estimate and FEQ circuit designs.

Figure 24:
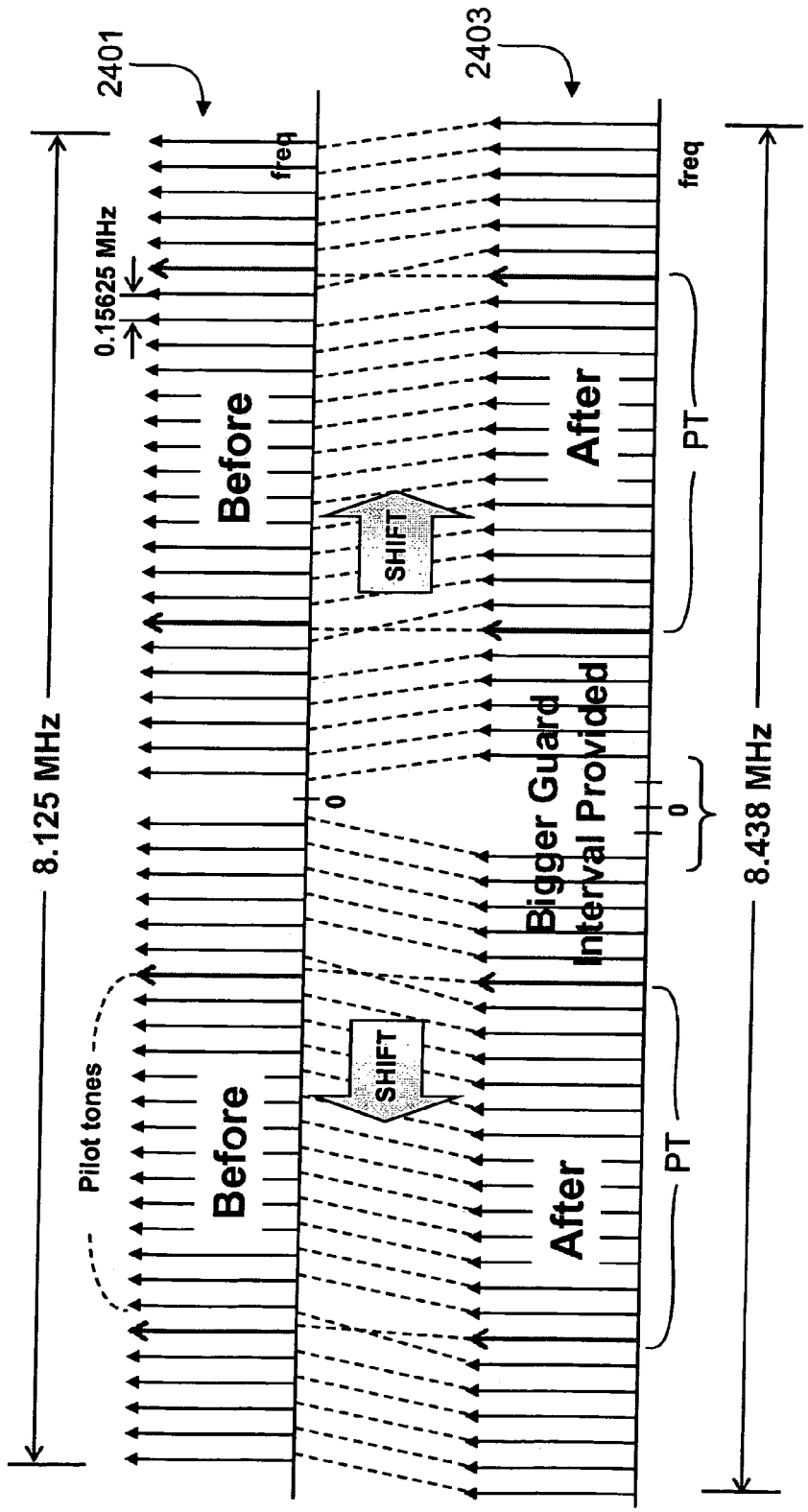
FIG. 24 is a graph diagram of a 10 MHz OFDM subcarrier packet structure profile before and after subcarrier shifting in accordance with an alternative embodiment of the present invention.

FIG. 24 is a graph diagram of a 10 MHz OFDM subcarrier packet structure profile before and after subcarrier shifting in accordance with an alternative embodiment of the present invention. The original subcarrier packet structure profile is shown at 1701 and the shifted subcarrier packet structure profile is shown at 2403. The original subcarrier packet structure profile 2401 is the same as 1401 and the subcarrier packet structure profile 2403 is similar to 1403 except that the pilot tones PT are not shifted. Instead, the pilot tones remain in their original positions and the remaining data subcarriers are shifted around the pilot tones PT. In particular, the pilot tones originally at −7 and −21 remain at −7 and −21 whereas the subcarriers originally at −6 and −20 are shifted two positions down to −8 and −22, respectively. Also, the pilot tones originally at +7 and +21 remain at +7 and +21 whereas the subcarriers originally at +6 and +20 are shifted two positions up to +8 and +22, respectively.

Figure 25:
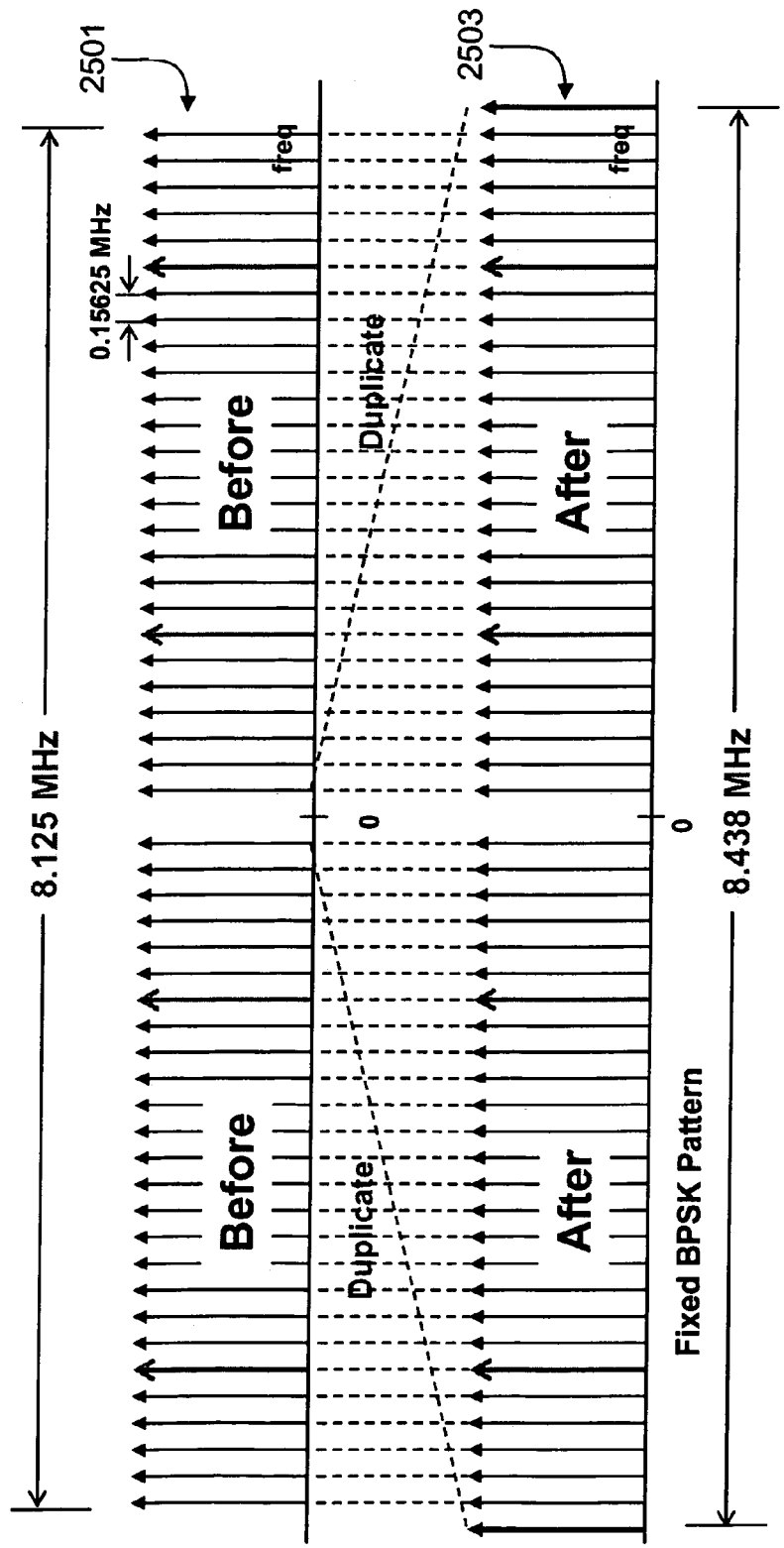
FIG. 25 is a graph diagram of a 10 MHz OFDM subcarrier packet structure profile in accordance with yet another alternative embodiment of the present invention.

FIG. 25 is a graph diagram of a 10 MHz OFDM subcarrier packet structure profile in accordance with yet another alternative embodiment of the present invention. The original subcarrier packet structure profile is shown at 2501 and is the same as 1401. The modified subcarrier packet structure profile is shown at 2503 and is similar to 2501 except that two duplicate subcarriers are appended at either end of the profile. In particular, the subcarrier at −1 is duplicated and appended at subcarrier position −27 and the subcarrier at +1 is duplicated and appended at subcarrier position +27. In this case, if the frequency offset destroys either one of the inner subcarriers, then the receiver retrieves the associated duplicate instead.

Appendix A includes additional details of embodiments of the present invention.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention.

The invention claimed is:

1. A 10 MHz channelized OFDM transmitter that communicates using a modified OFDM packet structure with a half-rate oscillator having standard accuracy, comprising:
   an IFFT data processor that appends an outer pair of data subcarriers on either end of an OFDM subcarrier profile; and
   an IFFT long sync processor that appends an outer pair of BPSK subcarriers on either end of an OFDM long sync subcarrier profile.

2. The 10 MHz channelized OFDM transmitter of claim 1, wherein said IFFT data processor shifts positive-frequency OFDM subcarriers up by one IFFT bin position and that shifts negative-frequency OFDM subcarriers down by one IFFT bin position.

3. The 10 MHz channelized OFDM transmitter of claim 2, wherein said IFFT data processor shifts each OFDM pilot tone and data subcarrier by one position.

4. The 10 MHz channelized OFDM transmitter of claim 2, wherein said IFFT data processor maintains frequency positions of OFDM pilot tones and shifts data subcarriers around said OFDM pilot tones.

5. The 10 MHz channelized OFDM transmitter of claim 1, wherein said IFFT data processor duplicates a pair of inner-most data subcarriers to said appended outer pair of data subcarriers.

6. The 10 MHz channelized OFDM transmitter of claim 5, wherein said IFFT data processor copies a pair of complex coefficients corresponding with said inner-most data subcarriers to bins of an IFFT block associated with said appended outer pair of data subcarriers for inverse Fourier processing.

7. The 10 MHz channelized OFDM transmitter of claim 5, further comprising:
   said IFFT data processor copying a pair of complex coefficients corresponding with said inner-most data subcarriers to first and second outer complex coefficients, respectively;
   an IFFT block that generates original time domain samples using said OFDM subcarrier profile;
   a tone generator device that provides time domain samples corresponding to first and second outer data subcarrier tones;
   a first multiplier that multiplies said first complex coefficient by said time domain samples corresponding to said first outer data subcarrier tone for generating first data subcarrier time domain samples;
   a second multiplier that multiplies said second complex coefficient by said time domain samples corresponding to said second outer data subcarrier tone for generating second data subcarrier time domain samples; and
   an adder that adds said original time domain samples to said first data subcarrier time domain samples and to said second data subcarrier time domain samples.

8. The 10 MHz channelized OFDM transmitter of claim 7, wherein said tone generator comprises:
   a memory device that stores time domain samples of said first outer data subcarrier tone; and
   a conjugate block that receives and converts said time domain samples of first outer data subcarrier tone into time domain samples of said second outer data subcarrier tone.

9. The 10 MHz channelized OFDM transmitter of claim 1, wherein said IFFT long sync processor comprises a first IFFT long sync processor that loads standard OFDM long sync subcarriers and a second IFFT long sync processor that appends said outer pair of BPSK subcarriers.

10. A 10 MHz channelized OFDM receiver that communicates using a modified OFDM packet structure with a half-rate oscillator having standard accuracy, comprising:
    an IFFT data processor that reads an outer pair of data subcarriers on either end of an OFDM subcarrier profile; and
    an IFFT long sync processor that reads an outer pair of BPSK subcarriers on either end of an OFDM long sync subcarrier profile.

11. The 10 MHz channelized OFDM receiver of claim 10, wherein said FFT data processor reads positive-frequency OFDM subcarriers shifted up by one IFFT bin position and that reads negative-frequency OFDM subcarriers shifted down by one FFT bin position.

12. The 10 MHz channelized OFDM receiver of claim 11, wherein said FFT data processor reads each OFDM pilot tone and data subcarrier shifted by one position.

13. The 10 MHz channelized OFDM receiver of claim 11, wherein said FFT data processor reads OFDM pilot tones at standard locations and reads data subcarriers shifted around said OFDM pilot tones.

14. The 10 MHz channelized OFDM receiver of claim 10, wherein said FFT data processor reads a pair of duplicated data subcarriers at said appended outer pair of data subcarriers.

15. The 10 MHz channelized OFDM receiver of claim 14, wherein said FFT data processor selected from among original data subcarriers and said duplicated data subcarriers.

16. The 10 MHz channelized OFDM receiver of claim 14, wherein said FFT data processor coherently combines original data subcarriers with said duplicated data subcarriers.

17. The 10 MHz channelized OFDM receiver of claim 10, further comprising:
    said IFFT long sync processor comprising a first FFT long sync processor that reads standard OFDM long sync subcarriers and that computes a first FEQ output;
    said IFFT long sync processor comprising a second IFFT long sync processor that reads said outer pair of BPSK subcarriers and that computes a second FEQ output; and
    select logic that discards an inner-most pair of long sync subcarriers.

* * * * *

UNITED STATES PATENT AND TRADEMARK OFFICE
CERTIFICATE OF CORRECTION

| | |
|---|---|
| PATENT NO. | : 7,272,109 B2 |
| APPLICATION NO. | : 10/927487 |
| DATED | : September 18, 2007 |
| INVENTOR(S) | : Mark A. Webster et al. |

Page 1 of 1

It is certified that error appears in the above-identified patent and that said Letters Patent is hereby corrected as shown below:

This certificate supersedes the Certificate of Correction issued April 1, 2008. The certificate should be vacated since no Certificate of Correction was granted for this patent number.

Signed and Sealed this

Twenty-ninth Day of April, 2008

JON W. DUDAS
*Director of the United States Patent and Trademark Office*